United States Patent
De Langen et al.

(10) Patent No.: US 11,004,800 B2
(45) Date of Patent: *May 11, 2021

(54) SECURE CHIPS WITH SERIAL NUMBERS

(71) Applicant: ASML Netherlands B.V., Veldhoven (NL)

(72) Inventors: Johannes Cornelis Jacobus De Langen, Delft (NL); Marcel Nicolaas Jacobus van Kervinck, The Hague (NL); Vincent Sylvester Kuiper, Delft (NL)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,033

(22) Filed: Nov. 26, 2019

(65) Prior Publication Data

US 2020/0098697 A1  Mar. 26, 2020

Related U.S. Application Data

(63) Continuation of application No. 15/444,369, filed on Feb. 28, 2017, now Pat. No. 10,522,472.

(Continued)

(51) Int. Cl.
*H01L 23/00* (2006.01)
*H01L 23/544* (2006.01)
(Continued)

(52) U.S. Cl.
CPC ............ *H01L 23/544* (2013.01); *G06F 21/44* (2013.01); *G06F 21/73* (2013.01); *G06K 7/1417* (2013.01);
(Continued)

(58) Field of Classification Search
None
See application file for complete search history.

(56) References Cited

U.S. PATENT DOCUMENTS

| 4,875,971 A | 10/1989 | Orbach et al. |
| 4,879,605 A | 11/1989 | Warkentin et al. |
| (Continued) | | |

FOREIGN PATENT DOCUMENTS

| CN | 101271825 A | 9/2008 |
| EP | 0712136 A2 | 5/1996 |
| (Continued) | | |

OTHER PUBLICATIONS

Anonymous, "Gate array—Wikipedia", Jul. 6, 2016, XP055403902, Internet:URL: https://en.wikipedia.org/w/index.php? title=Gate_array&oldid= 728662966.

(Continued)

*Primary Examiner* — Reema Patel
(74) *Attorney, Agent, or Firm* — Finnegan, Henderson, Farabow, Garrett & Dunner, LLP

(57) ABSTRACT

An electronic device comprising a semiconductor chip which comprises a plurality of structures formed in the semiconductor chip, wherein the semiconductor chip is a member of a set of semiconductor chips, the set of semiconductor chips comprises a plurality of subsets of semiconductor chips, and the semiconductor chip is a member of only one of the subsets. The plurality of structures of the semiconductor chip includes a set of common structures which is the same for all of the semiconductor chips of the set, and a set of non-common structures, wherein the non-common structures of the semiconductor chip of the subset is different from a non-common circuit of the semiconductor chips in every other subset. At least a first portion of the non-common structures and a first portion of the common structures form a first non-common circuit, wherein the first (Continued)

non-common circuit of the semiconductor chips of each subset is different from a non-common circuit of the semiconductor chips in every other subset. At least a second portion of the non-common structures is adapted to store or generate a first predetermined value which uniquely identifies the first non-common circuit, wherein the first predetermined value is readable from outside the semiconductor chip by automated reading means.

20 Claims, 12 Drawing Sheets

Related U.S. Application Data

(60) Provisional application No. 62/458,071, filed on Feb. 13, 2017, provisional application No. 62/458,062, filed on Feb. 13, 2017, provisional application No. 62/458,040, filed on Feb. 13, 2017, provisional application No. 62/458,082, filed on Feb. 13, 2017, provisional application No. 62/456,144, filed on Feb. 8, 2017, provisional application No. 62/438,548, filed on Dec. 23, 2016, provisional application No. 62/413,470, filed on Oct. 27, 2016, provisional application No. 62/385,049, filed on Sep. 8, 2016.

(51) Int. Cl.
| | |
|---|---|
| *G06K 19/06* | (2006.01) |
| *G06F 21/44* | (2013.01) |
| *G09C 5/00* | (2006.01) |
| *G06F 21/73* | (2013.01) |
| *H04L 29/06* | (2006.01) |
| *G06K 7/14* | (2006.01) |
| *H01L 25/065* | (2006.01) |
| *H04L 9/14* | (2006.01) |
| *H04L 9/32* | (2006.01) |

(52) U.S. Cl.
CPC . *G06K 19/06037* (2013.01); *G06K 19/06178* (2013.01); *G09C 5/00* (2013.01); *H01L 25/0652* (2013.01); *H04L 9/14* (2013.01); *H04L 9/3271* (2013.01); *H04L 63/08* (2013.01); *G06F 2221/2103* (2013.01); *H01L 2223/5444* (2013.01); *H01L 2223/54413* (2013.01); *H01L 2223/54433* (2013.01)

(56) References Cited

U.S. PATENT DOCUMENTS

| | | | |
|---|---|---|---|
| 4,974,736 A | 12/1990 | Okunuki et al. | |
| 5,093,550 A | 3/1992 | Gerber et al. | |
| 5,410,124 A | 4/1995 | Jackson | |
| 5,604,143 A | 2/1997 | Ishida et al. | |
| 5,733,711 A | 3/1998 | Juengling | |
| 6,063,685 A | 5/2000 | Steffan et al. | |
| 7,075,093 B2 | 7/2006 | Gorski et al. | |
| 7,107,560 B1 | 9/2006 | New | |
| 7,316,934 B2 | 1/2008 | Mangell | |
| 7,391,499 B2 | 6/2008 | Schmidt | |
| 7,407,252 B2 | 8/2008 | Chabreck et al. | |
| 7,590,966 B2 | 9/2009 | Sandstrom et al. | |
| 7,721,090 B1 | 5/2010 | Deepak et al. | |
| 7,818,569 B2 | 10/2010 | Devadas et al. | |
| 7,840,803 B2 | 11/2010 | Clarke et al. | |
| 7,842,525 B2 | 11/2010 | Sandstrom | |
| 8,492,072 B2 | 7/2013 | Sandtner | |
| 8,539,395 B2 | 9/2013 | Ivansen et al. | |
| 8,754,538 B2 | 6/2014 | OrtneL | |
| 8,767,185 B2 | 7/2014 | Sandstrom | |
| 8,872,833 B2 | 10/2014 | van Dyke et al. | |
| 8,893,059 B2 | 11/2014 | Carroll | |
| 8,896,809 B2 | 11/2014 | Dominicus et al. | |
| 8,972,229 B2 | 3/2015 | Deng et al. | |
| 9,140,978 B2 | 9/2015 | Ken | |
| 9,171,806 B2 | 10/2015 | Ortner | |
| 9,224,694 B2 | 12/2015 | Pagani | |
| 9,846,368 B2 | 12/2017 | Tinnemans et al. | |
| 10,522,472 B2 * | 12/2019 | De Langen ...... | G06K 19/06178 |
| 2001/0028991 A1 | 10/2001 | Inanami et al. | |
| 2001/0046730 A1 | 11/2001 | Suzuki et al. | |
| 2002/0010905 A1 | 1/2002 | Inanami et al. | |
| 2002/0074666 A1 | 6/2002 | Usami | |
| 2003/0064531 A1 | 4/2003 | Mautz et al. | |
| 2003/0144760 A1 | 7/2003 | Mangell | |
| 2004/0019791 A1 | 1/2004 | Whyte | |
| 2004/0095172 A1 | 5/2004 | Usami | |
| 2005/0047543 A1 | 3/2005 | Sandstrom | |
| 2005/0140502 A1 | 6/2005 | Ashizawa | |
| 2005/0177268 A1 | 8/2005 | Morinaga et al. | |
| 2005/0225348 A1 | 10/2005 | Zettler | |
| 2006/0064191 A1 | 3/2006 | Naya et al. | |
| 2006/0209313 A1 | 9/2006 | van den Akker et al. | |
| 2006/0221320 A1 | 10/2006 | Bleeker et al. | |
| 2007/0116276 A1 | 5/2007 | Tsurumoto | |
| 2007/0134560 A1 | 6/2007 | Dirksen et al. | |
| 2007/0195834 A1 | 8/2007 | Tanaka et al. | |
| 2007/0242252 A1 | 10/2007 | Tinnemans | |
| 2008/0027576 A1 | 1/2008 | Kyoh | |
| 2008/0119956 A1 | 5/2008 | Mangell | |
| 2008/0121709 A1 | 5/2008 | Hayashi et al. | |
| 2009/0011345 A1 | 1/2009 | Tinnemans et al. | |
| 2009/0100392 A1 | 4/2009 | Ivaldi | |
| 2009/0162760 A1 | 6/2009 | Hoshino et al. | |
| 2009/0315193 A1 | 12/2009 | Ortner | |
| 2010/0279231 A1 | 11/2010 | Sandtner | |
| 2012/0271444 A1 | 10/2012 | Matsumoto | |
| 2013/0127442 A1 | 5/2013 | Satoh et al. | |
| 2014/0170566 A1 | 6/2014 | Ivansen et al. | |
| 2015/0012439 A1 | 1/2015 | Sakurai et al. | |
| 2015/0026650 A1 | 1/2015 | Munson | |
| 2016/0126062 A1 | 5/2016 | Muraki et al. | |
| 2016/0148664 A1 | 5/2016 | Katoh et al. | |
| 2016/0254227 A1 | 9/2016 | Leobandung | |
| 2017/0269483 A1 | 9/2017 | Tinnemans et al. | |
| 2018/0069710 A1 | 3/2018 | De Langen | |

FOREIGN PATENT DOCUMENTS

| | | |
|---|---|---|
| EP | 1598854 A1 | 11/2005 |
| JP | S 58116732 | 7/1983 |
| JP | 4-273115 | 9/1992 |
| JP | 05343278 | 12/1993 |
| JP | A 09 007924 | 1/1997 |
| JP | 1998 090874 A | 4/1998 |
| JP | 2001 109128 | 4/2001 |
| JP | 2002 055431 A | 2/2002 |
| JP | 2002 305141 A | 10/2002 |
| JP | 2005-57203 | 3/2005 |
| JP | 2005 159198 A | 7/2005 |
| JP | 2005-244132 | 9/2005 |
| JP | 2006 139165 A | 6/2006 |
| JP | 2007 514987 A | 6/2007 |
| JP | 2007 260295 | 10/2007 |
| JP | 2008 047857 A | 2/2008 |
| JP | 2010-93663 | 4/2010 |
| JP | 2011 108830 | 6/2011 |
| JP | 2011 124587 | 6/2011 |
| JP | 2011 253226 A | 12/2011 |
| JP | 2012-12712 A | 1/2012 |
| JP | 2014 515885 A | 7/2014 |
| JP | 2016086103 A | 5/2016 |
| JP | 2016-105585 A | 6/2016 |
| KR | 10-2016-0034300 A | 3/2016 |
| WO | WO 1998 052226 | 11/1998 |
| WO | WO 1999 042945 A1 | 8/1999 |
| WO | WO 2001 039269 A1 | 5/2001 |
| WO | WO 2002 084719 | 10/2002 |
| WO | WO 2003 090259 A2 | 10/2003 |
| WO | WO 2004105125 | 12/2004 |

(56) References Cited

FOREIGN PATENT DOCUMENTS

| WO | WO 2006 064921 | 6/2006 |
|---|---|---|
| WO | WO 2008 043934 | 4/2008 |
| WO | WO 2010 134026 | 11/2010 |
| WO | WO 2010134026 A1 | 11/2010 |
| WO | WO 2011 003201 A1 | 1/2011 |
| WO | WO 2011 051301 | 5/2011 |
| WO | WO 2011 107601 A1 | 9/2011 |
| WO | WO 2011 117253 | 9/2011 |
| WO | WOW11 107603 | 9/2011 |
| WO | WO 2012 062726 | 5/2012 |
| WO | WO 2012 062727 A1 | 5/2012 |
| WO | WO 2012 143548 | 10/2012 |
| WO | WO 2012 143555 A2 | 10/2012 |
| WO | WO 2015 008021 A1 | 1/2015 |
| WO | WO 2015 150398 | 10/2015 |
| WO | WO 2016 156378 A1 | 10/2016 |
| WO | WO 2016156378 A1 | 10/2016 |

OTHER PUBLICATIONS

"Application-specific IC" Nov. 25, 2016 {Nov. 25, 2016), XP055403899, Internet: https ://en.wikiped ia. org/w/index. php ?title=Applicatio n-specific _integrated_ circuit&oldid = 7 513 76110.

Ed Korczynski, "Multi beam Patents Direct Deposition & Direct Etch", https://semimd.com/blog/2016/11 /14, Nov. 14, 2016.

Mark Lapedus, "New Patterning Paradigm?", https://semiengineering. com, Apr. 16, 2015.

Parker et al: "A high throughput electron-beam direct-write lithography system", Microlithography World, US, Edit 9, nr. 3, Jan. 1, 2000 (Jan. 1, 2000), bladzijden 22. 24-25.

Notification of Reason for Refusal issued by the Korean Intellectual Property Office in corresponding Korean Application No. 10-2019-7021447. (15 pages).

\* cited by examiner

SECURE CHIPS WITH SERIAL NUMBERS

CROSS REFERENCE TO RELATED APPLICATIONS

This application is a continuation application of application Ser. No. 15/444,369, entitled "SECURE CHIPS WITH SERIAL NUMBERS," filed Feb. 28, 2017, which claims priority from U.S. application No. 62/385,049 filed on 8 Sep. 2016, U.S. application No. 62/413,470 filed on 27 Oct. 2016, U.S. application No. 62/438,548 filed on 23 Dec. 2016, U.S. application No. 62/456,144 filed on 8 Feb. 2017, U.S. application No. 62/458,040 filed on 13 Feb. 2017, U.S. application No. 62/458,071 filed on 13 Feb. 2017, U.S. application No. 62/458,082 filed on 13 Feb. 2017 and U.S. application No. 62/458,062 filed on 13 Feb. 2017. All priority applications are hereby incorporated by reference in their entireties.

TECHNICAL FIELD

The invention relates to electronic devices comprising semiconductor chips. More specifically, the invention relates to electronic devices comprising a semiconductor chip having a common part and a unique part forming a unique circuit. The invention further relates to systems for authentication between a plurality of remote terminals comprising such electronic devices and a host system based on a challenge-response procedure, a remote terminal for use in such system, and a method for authentication in such system.

BACKGROUND ART

In the semiconductor industry, lithography systems are used to create, i.e. fabricate electronic devices, typically in the form of integrated circuits formed on silicon wafer, commonly referred to as semiconductor chips. Photolithography utilizes reusable optical masks to project an image of a pattern representing the desired circuit structures onto a silicon wafer as part of the manufacturing process. The mask is used repeatedly to image the same circuit structures on different parts of a silicon wafer and on subsequent wafers, resulting in a series of identical chips being fabricated from each wafer, each chip having an identical circuit design.

Various technologies relating to security, such as data security, secure communications, traceability, authentication, anti-counterfeiting etc., create an increasing need for unique chips having unique circuits or codes, or other unique hardware features for diversification of the chips. Such unique chips are known and often implement a security related operation in an obfuscated manner requiring the chip to be truly unique. The known unique chips are typically realized after the manufacture of a chip, e.g. by manufacturing a series of identical chips using conventional mask-based photolithography and then, after manufacture, disrupting certain connections in the chip or by assessing the uniqueness of the chip afterwards upon inspection and control of certain features. The masks used in this process are expensive to produce, and manufacturing unique masks for each single chip is clearly much too expensive, for which reason mask based photolithography is considered unsuitable for fabricating unique chips.

Semiconductor chips can be created to contain predetermined data or code, i.e. in the form of readable data, typically using mask ROM (MROM), erasable programmable read-only memory (EPROM) or electrically erasable programmable read-only memory (EEPROM). The MROM variant uses masked-based lithography to create the ROM including the data stored permanently in the ROM, with the above identified drawbacks of mask-based lithography when creating chips with unique codes. EPROM and EEPROM allow the data to be written to the ROM at a later stage, but this disadvantageously takes control over the code away from the manufacturing process and introduces security risks.

It has been suggested to utilize maskless lithography for the purpose of creating unique chips. With maskless lithography no hard mask is used, and instead the required pattern representing the circuit design is input to the maskless lithography system in the form of a design layout data file such as a GDSII or OASIS file containing the circuit design layout to be transferred to the target, e.g. wafer, to be exposed by the maskless lithography system.

A maskless lithography and data input system is disclosed in WO 2010/134026 in the name of Applicant of the present invention. WO 2010/134026 is hereby incorporated by reference in its entirety. The disclosed maskless system writes patterns onto wafers directly using charged particle beamlets such as electron beamlets. Because the desired pattern for exposing each chip is represented as data instead of a mask, it becomes possible to utilize such system for the manufacture of unique chips. The pattern data that is input to the exposure system, representing the unique electronic devices or chips to be created, may be made unique by using a different design layout data input file, e.g. a GDSII or OASIS input file, for each unique electronic device to be created.

WO 2011/117253 and WO 2011/051301, both assigned to the Applicant of the present invention and hereby incorporated by reference in their entirety, disclose various examples of electronic devices or chips that can be created using a charged particle lithography system.

SUMMARY OF THE INVENTION

The present invention addresses the problems of the prior art, and provides according to an aspect of the invention an electronic device comprising a semiconductor chip. The semiconductor chip can comprise a plurality of structures formed in the semiconductor chip. The semiconductor chip can be a member of a set of semiconductor chips, where the set of semiconductor chips comprises a plurality of subsets of semiconductor chips, and the semiconductor chip is a member of only one of the subsets. The subsets of the semiconductor chips may each comprise only a single chip, so that every chip of the set is unique, or each subset may comprise e.g. two chips, so that each chip has a single identical spare. The set of semiconductor chips may consist of chips all having a single design for performing the same function, the chips all having the same input and output terminals and designed for operation in the same system, but each subset of chips including a non-common circuit which is different from the circuits formed in all the other chips of the set.

The semiconductor chip can comprise a plurality of structures formed in the semiconductor chip. The plurality of structures of the semiconductor chip includes a set of common structures which are the same for all of the semiconductor chips of the set, and a set of non-common structures which are the same for all of the semiconductor chips of the subset and is different from all semiconductor chips of the set which are not in the subset. At least a first portion of the non-common structures and a first portion of the common structures form a first non-common circuit, wherein the first non-common circuit of the semiconductor chips of each subset is different from a non-common circuit of the semiconductor chips in every other subset. At least a second portion of the non-common structures is adapted to store or generate a first predetermined value which uniquely identifies the first non-common circuit, wherein the first predetermined value is readable from outside the semiconductor chip by automated reading means.

The first predetermined value is readable from outside the semiconductor chip by automated electromagnetic reading means (e.g. using a non-contact sensor), optical reading means (e.g. using an optical scan of an embedded small QR code in an upper layer of the chip), or electronic reading means (e.g. using probe needles or by receiving an output signal from the chip). The first predetermined value may be, for example, a serial number, a cryptographic key such as a public key, an account number, a network address such as a media access control (MAC) address or internet protocol (IP) address, or an identification code.

The first predetermined value may be readable from the structure of the second portion of the non-common structures, e.g. by detecting the shape of the structures using an optical or other suitable sensor for scanning the structures. The shape of the second portion of the non-common structures may be used to store the first predetermined value, e.g. by forming a metal layer in the shape of a small bar code or QR code, or an optically identifiable set of metal lines, vias, or circuitry. This layer is preferably in an intermediate or lower layer, i.e. not the top layer of the semiconductor chip, or the structures may be formed on more than one layer.

A second non-common circuit may be formed from the second portion of the non-common structures of the semiconductor chip and a second portion of the common structures of the semiconductor chip, wherein the second non-common circuit of the semiconductor chips of each subset is different from a non-common circuit of the semiconductor chips in every other subset. The second non-common circuit may comprise a read-only memory circuit, which may be fabricated with the first predetermined value pre-stored in the read-only memory circuit. The first predetermined value may be stored by the presence or absence of memory cell elements in the read-only memory circuit, or by the connection or disconnection of memory cell elements. Where a conventional ROM structure is used, predetermined ones of the memory cell elements (such as transistors or diodes etc.) connecting the word lines and bit lines of the memory matrix may be formed or not formed (or formed with varying structure) or connected or disconnected during the chip manufacturing process, to produce a ROM which stores the first predetermined value. In this way, the read-only memory circuit with pre-stored value may be formed during the manufacturing process. This type of e.g. ROM which stores the predetermined value in its structure made during the chip manufacturing process, where the first predetermined value may be unique among the set of semiconductor chips, is made feasible by the use of maskless lithography.

The second non-common circuit may comprise a logic circuit which is adapted to generate the first predetermined value. The first predetermined value may be stored by the presence or absence of interconnections in the logic circuit, or the presence or absence of circuit elements in the logic circuit, so that the first predetermined value is effectively stored in the structure of the logic circuit. Such a memory circuit or logic circuit may comprise transistors and interconnections, where the interconnections or the transistors may be formed or not formed (or formed with varying structure) or connected or disconnected during the chip manufacturing process, to produce a logic circuit which generates the first predetermined value. One convenient method is to utilize vias in the memory or logic circuit, where the vias are formed or not formed during the manufacturing process to provide a memory circuit which will store or a logic circuit which will generate the predetermined value. In this way, the memory or logic circuit may pre-store the first predetermined value during the manufacturing process.

The first non-common circuit may comprise a logic circuit which is adapted to generate a second predetermined value in response to an input. For example, the input could be a challenge and the second predetermined value is response which is uniquely associated with the challenge and the semiconductor chip. The first non-common circuit may also comprise a read-only memory circuit which is fabricated with a second predetermined value pre-stored in the first non-common circuit. The second predetermined value may be the same as the first predetermined value, so that one may be used as a check of the other or they may be used with different reading sensors. For example, the first predetermined value may be optically readable while the second predetermined value is electronically readable. Alternatively, the two values may be different.

The first predetermined value of the semiconductor chip may be different from a predetermined value of every other semiconductor chip of the set of the semiconductor chips, and also the set of non-common structures of the semiconductor chip may be different from the set of non-common structures of every other semiconductor chip of the set of the semiconductor chips.

The first non-common circuit may comprise a memory or logic circuit which is the same for all of the semiconductor chips of the subset and is different from all semiconductor chips of the set which are not in the subset, wherein the first predetermined value uniquely identifies the first non-common circuit.

The common structures and the non-common structures of the semiconductor chip may be interconnected to form one or more electronic circuits. The electronic device may comprise at least one input terminal and at least one output terminal, and the second non-common circuit may be connected to the input and output terminals, wherein first predetermined value is electronically readable from the output terminal. The electronic device may comprise at least one input terminal for receiving a challenge and at least one output terminal for outputting a response, and the electronic circuit may form a challenge-response circuit connected to the at least one input terminal and the at least one output terminal, wherein the challenge-response circuit is adapted for generating a response at the at least one output terminal based on a challenge applied to the at least one input terminal, the challenge and the response having a predetermined relationship. The response generated by the challenge-response circuit may depend on both the challenge applied to the at least one input terminal and the first predetermined value.

The plurality of structures may be formed in three or more layers of the semiconductor chip, including one or more non-common layers containing the non-common structures, with at least one common layer formed above the one or more non-common layers, wherein the at least one common layer contains common structures but no non-common structures. Optionally, all of the non-common structures may be formed on only one layer of the semiconductor chip. The semiconductor chip may also comprise at least a second common layer below the one or more non-common layers, the second common layer containing common structures but no non-common structures. In this way, the layer(s) including the non-common structures may be 'buried' under other layers making it more difficult to determine the structures without expensive reverse engineering of the chip. The non-common structures may include at least one of: connections between metal layers of the plurality of layers; connections between a metal layer and a gate in a contact layer of the plurality of layers; connections in a local interconnect layer of the plurality of layers; and a P- or N-doped diffusion region of a transistor or diode of one of the plurality of layers.

The non-common structures of the one or more common layers may be formed using a maskless lithography process, such as exposure using a charged particle multi-beamlet lithography system, and the common layers may be formed using a mask-based lithography process. The use of a maskless lithography process for forming the non-common structures enables forming first and second non-common circuits having a very high information storage density, much higher density than previous methods using printed circuits, fuses, one-time programmable circuits and memories, etc. This very high information density enables the non-common circuits to store very long predetermined values, such as very long cryptographic keys or many long cryptographic keys. The very small feature size of the non-common structures and circuits which is possible when using maskless lithography (e.g. a feature size of less than 50 nm) enables the non-common circuits to be small in area and/or distributed over multiple layers. This makes it much more difficult to discover the data stored in the non-common circuits of the circuit layout of the non-common circuits, either by inspection of the chip or by reverse engineering of the chip, unlike previously known techniques.

According to an aspect of the invention a system is proposed for authentication between a plurality of remote terminals and a host system based on a challenge-response procedure. Each of the remote terminals can comprise an electronic device as described above.

According to an aspect of the invention a remote terminal is proposed adapted for use in a system described above.

According to an aspect of the invention a method is proposed for authentication in a system described above. The method can comprise distributing the remote terminals to a plurality of users, sending a challenge from the host system to one of the remote terminals, receiving a response from the remote terminal, and authenticating the remote terminal if the response has to predetermined relationship with the challenge.

Where at manufacture optical lithography is applied in conjunction with maskless lithographic exposures, the identical part may be created using photolithography or charged particle multi-beam lithography. The unique part of a target, electronic device in particular is created using charged particle multi-beam lithography. The pattern data used to control the beamlets in the charged particle lithography system may be designed to include a common chip design part that can be used in the creation of multiple chips and a unique chip design part that is used in the creation of a unique chip. The unique chip design part can in particular be added to the pattern data just before exposing a target such as a wafer. This may be either in the form of unique pattern data or in the form of information used to create the unique pattern data.

Advantageously the method of creating secure devices according to this method enables the unique design data to remain under control of the operator of the lithography system and the exposure time of the unique design data is minimized, hence forms a major, new measure and manufacturing method, which enables applying security at manufacturing unique electronic devices in use of the known maskless exposure based manufacturing method. An advantageous additional effect is that the required processing power and memory may remain low, in that a common chip design part can be reused for the creation of multiple chips, where utilizing the known, straight forward manner of creating unique chips would require capacity and processing time for each unique chip design manufactured utilizing the known method of producing unique chips using maskless, generally charged particle based lithography.

The electronic device comprising a semiconductor chip as described above and in the embodiments described below, may include unique (non-common) electrical circuits to provide functions in security systems which rely on the uniqueness of the circuitry. For example, the electronic device may be used in a secure communication or transaction system to provide authentication services, where the first non-common circuit of the semiconductor chip comprises a data storage circuit such as a mask ROM which is fabricated with a pre-stored value and adapted to output the value which comprises an ID number or code uniquely identifying the electronic device. The second non-common circuit may comprise a logic or cryptographic circuit adapted to receive an input value (e.g. a challenge input) and generate a unique output in response to the input which, together with the ID, authenticates the electronic device to the secure system.

In another example, the electronic device may be used in an equipment management system, in which the first non-common circuit is adapted as in the example above to output an ID number or code uniquely identifying the electronic device, and the second non-common circuit is adapted to generate an output in response to an input to enable a function or feature of a circuit of the electronic device, or to enable a function or feature of software running on the electronic device or running on another device. The second non-common circuit may be adapted to apply a decryption algorithm specific to the electronic device, or apply a decryption key specific to the electronic device, to decrypt the input, and the input may be encrypted according to the algorithm or key of the specific chip.

In another example, the electronic device may be used in a cryptographic data storage system, in which the first non-common circuit is adapted as in the example above to output an ID number or code uniquely identifying the electronic device, and the second non-common circuit is adapted to receive data at an input and perform encryption of the received data and output the encrypted data, where the encryption key and/or the encryption algorithm applied by the electronic device to encrypt the data is unique to the electronic device.

In another example, the electronic device may be used in a communication network, in which the first and/or the second non-common circuits comprise data storage circuits fabricated with pre-stored values and adapted to output the values, such as a media access control (MAC) address or internet protocol (IP) address, which uniquely identify the electronic device on the network. Such an electronic device may also be used in a manufacturing facility, in which the first and/or the second non-common circuits comprise data storage circuits fabricated with pre-stored values and adapted to output one or more values, such as an ID code or cryptographic key, for uniquely matching the electronic device with a personalized device in which the electronic device is to be placed (such as a smart ID chip placed in a passport or bank card or a ship with a cryptographic keys placed in personalized communication device. The electronic device may be adapted to respond to a challenge to output the pre-stored value(s) and read by the machine that places the electronic device into the personalized device.

In another example, the electronic device may be used for secure matching of a serial number(s) with cryptographic key(s). The very high information density of chip layer(s) written with maskless lithography, for example enabling the first non-common circuit to store a first predetermined value such as a serial number (which is shorter and easy to communicate and challenge) and the second non-common circuit to store a very long secret cryptographic key or many long cryptographic keys. The possibility of very large cryptographic keys allows e.g. to use one-time-pad (OTP) encryption which requires the key to be of the same length as the message being sent, and can be impossible to break. The very small feature size possible when using maskless lithography also makes it very difficult to retrieve the cryptographic keys by inspection or reverse engineering of the chip.

Various aspects and embodiments of the invention are further defined in the following description and claims.

Hereinafter, embodiments of the invention will be described in further detail. It should be appreciated, however, that these embodiments may not be construed as limiting the scope of protection for the present invention.

BRIEF DESCRIPTION OF THE DRAWINGS

Embodiments will now be described, by way of example only, with reference to the accompanying schematic drawings in which corresponding reference symbols indicate corresponding parts, and in which.

Figure 1:
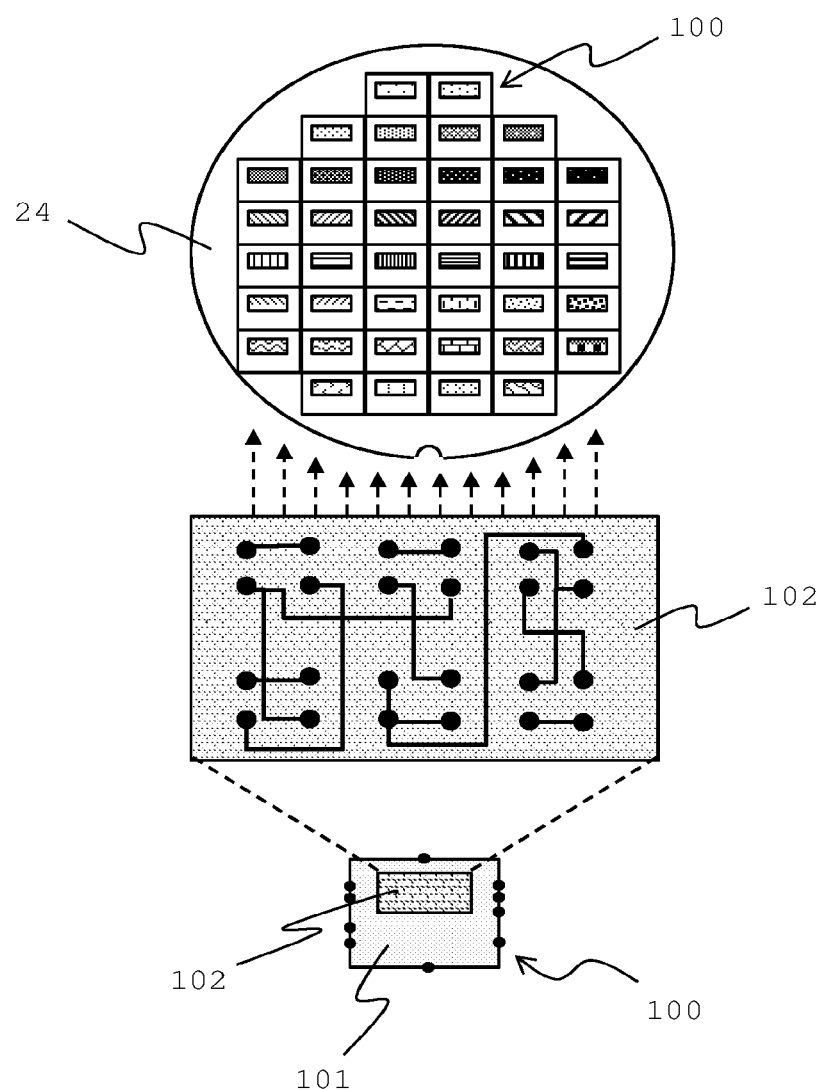
FIG. 1 shows a simplified unique chip and a wafer with multiple unique chips of an exemplary embodiment of the invention.

The figures are intended for illustrative purposes only, and do not serve as restriction of the scope or the protection as defined by the claims.

DESCRIPTION OF EMBODIMENTS

In the following examples reference is made to 'chips' or 'semiconductor chips', referring to integrated circuits fabricated on a semiconductor wafer. However, it is to be understood that the invention is not limited to chips and applies more generally to the creation of electronic devices having individualized, e.g. unique features. The electronic device may comprise a chip or other type of electronic circuit having one or more inputs and outputs, and functioning to store data or process an input to generate a particular output.

The process performed using charged particle multi-beamlet lithography for writing a pattern on a target such as a semiconductor wafer is also referred to herein as an electron beam or e-beam exposure. These exposure methods are maskless exposure methods, where the pattern to be exposed on the target is embodied in data which is (usually) streamed to the lithography system, rather than being embodied in a predefined mask. The charged particle/electron beams used for writing a target such as a wafer during exposure are also being referred to herein as beamlets.

Individualized chips are referred to herein as 'unique' chips. This refers to a chip which is designed and fabricated with a unique circuit structure with respect to other chips, so that the unique chip functions differently from the other chips. Such a unique chip is typically one chip of a large set of chips having the same purpose and same general function, but having a slightly different circuit. For example, the set of chips may include a read only memory (ROM) having a certain data storage capacity, each chip of the set fabricated so that it stores a predetermined data value in the ROM, where the data value is different for every chip of the set of chips. In another example, the set of chips may include a circuit for generating a predetermined output value when provided with a predetermined input value, where the output value is different for every chip of the set of chips when provided with the same input value, or where each chip of the set of chips generates a unique combination of output value to input value.

It should be noted that it the possibility is not excluded that more than one chip of the set of chips may have an identical design, for example to create a spare chip for use in case the chip having the same design is damaged, or to create batches of the same chip for some other reason. Thus, a set of chips may be divided into subsets, in which the chips in each subset are designed to be the same, but they are designed to be different from the chips in every other subset. A unique chip that is designed to be different from every other chip may be referred to as a truly unique chip, i.e. the subset size is one.

The unique part of the chip, the unique structures formed as part of the unique chip, and the unique design data used for creating part of the unique chip, are also referred to herein as the non-common part, non-common structures, and non-common design data.

FIG. 1 shows an exemplary simplified diagram of a unique chip 100 formed on a semiconductor wafer 24. The unique chip 100 comprises a common part 101 and a unique or non-common part 102. The common part 101 may be replicated in other chips created on the wafer 24 resulting in multiple chips having the same identical common part 101. The unique part 102 may be different from all of the other chips created on the wafer 24. This is illustrated in the top of FIG. 1 where a wafer 24 is shown containing a unique chip 100 and 39 other unique chips, each unique chip having a different individualized area. The combination of common part 101 and unique part 102 may result in the complete circuit for unique chip 100.

The unique part 102 may be realized by selecting and writing a unique combination of certain specific structures (such as interconnecting lines, conducting vias, terminals of transistors and diodes, active regions of transistors and diodes etc.) for each chip on the wafer 24, so that each chip on the wafer has a unique structure. Chips are typically formed from multiple layers of conducting, insulating, and semiconducting material, and multiple exposure operations are used to form predefined structures within these layers.

Each chip on the wafer typically has conducting vias for making electrical connections between different conducting (metal) layers of the chip, as illustrated in the middle part of FIG. 1 by the black dots. Each chip on the wafer 24 may have a different combination of vias formed, by forming or not forming a via at each possible via location in the unique part 102 of the chip, to create a different set of electrical interconnections between layers for each chip, so that each of the chips has an electrically-different circuit.

Each chip on the wafer typically has one or more layers of semiconducting material having P or N-type dopant added to form the active regions of active circuit elements, such as transistors or diodes, formed in the chip. Each chip on the wafer 24 may have a different combination of active circuit elements formed, by doping or not-doping or varying the doping of each active circuit element in the unique part 102 of the chip, so that each of the chips has an electrically-different circuit.

Alternatively or additionally, other connections between metal layers, connections between a metal layer and a gate e.g. in a contact layer, connections in a local interconnect layer, or other features of the circuit may be selectively formed in a unique combination for each chip to realize the unique part 102.

The common part 101 may be created using photolithography or charged particle multi-beam lithography. The unique part 102 is typically created using charged particle multi-beam lithography. Moreover, the pattern data used to control the beamlets in the charged particle lithography system may be designed to include a common chip design part that is used for multiple chips on the wafer and a unique part that is used for the individualized area. For the reasons set out in the background section it is undesirable to generate the pattern data including the common chip design part and the unique chip design part at once. Therefore the lithography system has been adapted to enable insertion of the unique chip design part into the pattern data at a late stage in the preprocessing stage before exposure, i.e. close to the actual patterning of the wafer. This will be explained in more detail in conjunction with FIGS. 4A-4D and FIG. 5.

Figure 2:
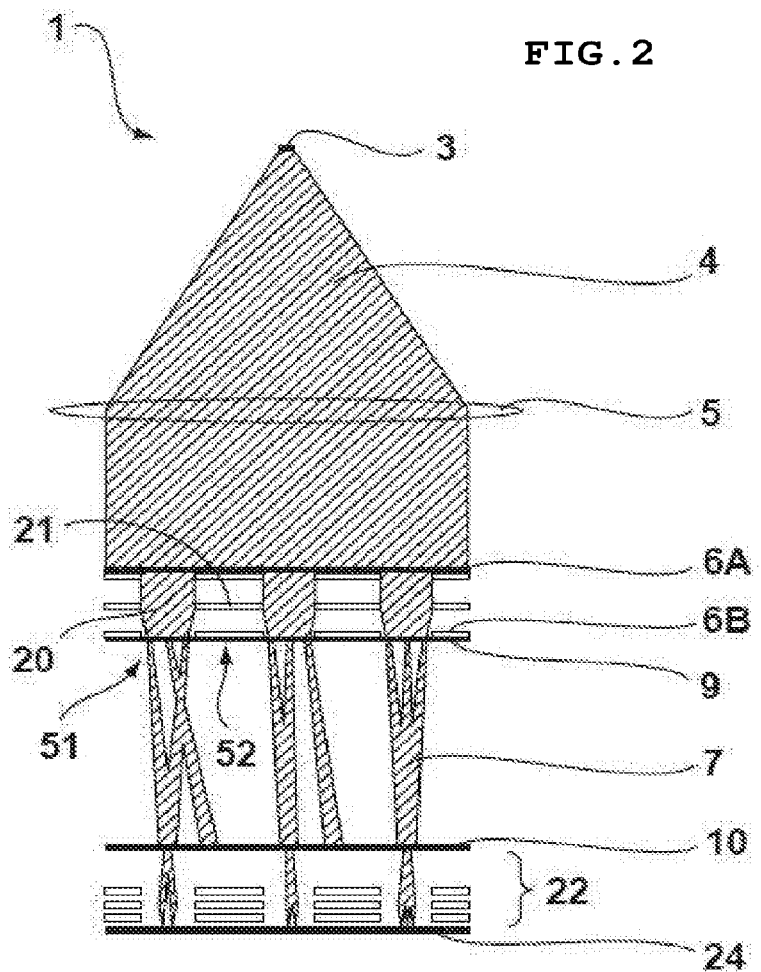
FIG. 2 shows a simplified schematic drawing of an exemplary embodiment of a charged particle multi-beamlet lithography system.

FIG. 2 shows a simplified schematic drawing of an exemplary embodiment of a charged particle multi-beamlet lithography machine 1, which may be used for implementing a maskless pattern writer. Such a lithography machine suitably comprises a beamlet generator generating a plurality of beamlets, a beamlet modulator patterning said beamlets into modulated beamlets, and a beamlet projector for projecting said beamlets onto a surface of a target. The target is for example a wafer. The beamlet generator typically comprises a source and at least one aperture array. The beamlet modulator is typically a beamlet blanker with a blanking deflector array and a beam stop array. The beamlet projector typically comprises a scanning deflector and a projection lens system.

In the embodiment shown in FIG. 2, the lithography machine 1 comprises an electron source 3 for producing a homogeneous, expanding electron beam 4. Beam energy is preferably maintained relatively low in the range of about 1 to 10 keV. To achieve this, the acceleration voltage is preferably low, the electron source preferably kept at between about −1 to −10 kV with respect to the target at ground potential, although other settings may also be used.

The electron beam 4 from the electron source 3 may pass a double octopole and subsequently a collimator lens 5 for collimating the electron beam 4. As will be understood, the collimator lens 5 may be any type of collimating optical system. Subsequently, the electron beam 4 may impinge on a beam splitter, which is in one suitable embodiment an aperture array 6A. The aperture array 6A may block part of the beam and may allow a plurality of subbeams 20 to pass through the aperture array 6A. The aperture array preferably comprises a plate having through-holes. Thus, a plurality of parallel electron subbeams 20 may be produced.

A second aperture array 6B may create a number of beamlets 7 from each subbeam. Beamlets are also being referred to as e-beams. The system may generate a large number of beamlets 7, preferably about 10,000 to 1,000,000 beamlets, although it is of course possible to use more or less beamlets. Note that other known methods may also be used to generate collimated beamlets. This allows the manipulation of the subbeams, which turns out to be beneficial for the system operation, particularly when increasing the number of beamlets to 5,000 or more. Such manipulation is for instance carried out by a condenser lens, a collimator, or lens structure converging the subbeams to an optical axis, for instance in the plane of the projection lens.

A condenser lens array 21 (or a set of condenser lens arrays) may be included behind the subbeam creating aperture array 6A, for focusing the subbeams 20 towards a corresponding opening in the beam stop array 10. A second aperture array 6B may generate beamlets 7 from the subbeams 20. Beamlet creating aperture array 6B is preferably included in combination with the beamlet blanker array 9. For instance, both may be assembled together so as to form a subassembly. In FIG. 2, the aperture array 6B produces three beamlets 7 from each subbeam 20, which strike the beam stop array 10 at a corresponding opening so that the three beamlets are projected onto the target by the projection lens system in the end module 22. In practice a much larger number of beamlets may be produced by aperture array 6B for each projection lens system in end module 22. In one embodiment, 49 beamlets (arranged in a 7×7 array) may be generated from each subbeam and are directed through a single projection lens system, although the number of beamlets per subbeam may be increased to 200 or more.

Generating the beamlets 7 stepwise from the beam 4 through an intermediate stage of subbeams 20 has the advantage that major optical operations may be carried out with a relatively limited number of subbeams 20 and at a position relatively remote from the target. One such operation is the convergence of the subbeams to a point corresponding to one of the projection lens systems. Preferably the distance between the operation and the convergence point is larger than the distance between the convergence point and the target. Most suitably, use is made of electrostatic projection lenses in combination herewith. This convergence operation enables the system to meet requirements of reduced spot size, increased current and reduced point spread, so as to do reliable charged particle beam lithography at advanced nodes, particularly at nodes with a critical dimension of less than 90 nm.

The beamlets 7 may next pass through an array of modulators 9. This array of modulators 9 may comprise a beamlet blanker array having a plurality of blankers, which are each capable of deflecting one or more of the electron beamlets 7. The blankers may more specifically be electrostatic deflectors provided with a first and a second electrode, the second electrode being a ground or common electrode. The beamlet blanker array 9 constitutes with beam stop array 10 a modulating device. On the basis of beamlet control data, the modulating means 8 may add a pattern to the electron beamlets 7. The pattern may be projected onto the target 24 by means of components present within an end module 22.

In this embodiment, the beam stop array 10 comprises an array of apertures for allowing beamlets to pass through. The beam stop array, in its basic form, may comprise a substrate provided with through-holes, typically round holes although other shapes may also be used. In one embodiment, the substrate of the beam stop array 8 is formed from a silicon wafer with a regularly spaced array of through-holes, and may be coated with a surface layer of a metal to prevent surface charging. In one embodiment, the metal may be of a type that does not form a native-oxide skin, such as CrMo.

In one embodiment, the passages of the beam stop array 10 may be aligned with the holes in the beamlet blanker array 9. The beamlet blanker array 9 and the beamlet stop array 10 typically operate together to block or let pass the beamlets 7. If beamlet blanker array 9 deflects a beamlet, it will not pass through the corresponding aperture in beamlet stop array 10, but instead will be blocked by the substrate of beamlet block array 10. But if beamlet blanker array 9 does not deflect a beamlet, then it will pass through the corresponding apertures in beamlet stop array 10 and will then be projected as a spot on a target surface 13 of the target 24.

The lithography machine 1 may furthermore comprise a data path for supplying beamlet control data, e.g. in the form of pattern bitmap data, to the beamlet blanker array 9. The beamlet control data may be transmitted using optical fibers. Modulated light beams from each optical fiber end may be projected on a light sensitive element on the beamlet blanker array 9. Each light beam may hold a part of the pattern data for controlling one or more modulators coupled to the light sensitive element.

Subsequently, the electron beamlets 7 may enter the end module. Hereinafter, the term 'beamlet' refers to a modulated beamlet. Such a modulated beamlet effectively comprises time-wise sequential portions. Some of these sequential portions may have a lower intensity and preferably have zero intensity—i.e. portions stopped at the beam stop. Some portions may have zero intensity in order to allow positioning of the beamlet to a starting position for a subsequent scanning period.

The end module 22 is preferably constructed as an insertable, replaceable unit, which comprises various components. In this embodiment, the end module may comprise a beam stop array 10, a scanning deflector array 11, and a projection lens arrangement 12, although not all of these need be included in the end module and they may be arranged differently.

After passing the beamlet stop array 10, the modulated beamlets 7 may pass through a scanning deflector array 11 that provides for deflection of each beamlet 7 in the X- and/or Y-direction, substantially perpendicular to the direction of the undeflected beamlets 7. In this embodiment, the deflector array 11 may be a scanning electrostatic deflector enabling the application of relatively small driving voltages.

Next, the beamlets may pass through projection lens arrangement 12 and may be projected onto a target surface 24 of a target, typically a wafer, in a target plane. For lithography applications, the target usually comprises a wafer provided with a charged-particle sensitive layer or resist layer. The projection lens arrangement 12 may focus the beamlet, for example resulting in a geometric spot size of about 10 to 30 nanometers in diameter. The projection lens arrangement 12 in such a design for example provides a demagnification of about 100 to 500 times. In this preferred embodiment, the projection lens arrangement 12 is advantageously located close to the target surface.

In some embodiments, a beam protector may be located between the target surface 24 and the focusing projection lens arrangement 12. The beam protector may be a foil or a plate, provided with needed apertures, for absorbing the resist particles released from the wafer before they can reach any of the sensitive elements in the lithography machine. Alternatively or additionally, the scanning deflection array 9 may be provided between the projection lens arrangement 12 and the target surface 24.

Roughly speaking, the projection lens arrangement 12 focuses the beamlets 7 to the target surface 24. Therewith, it further ensures that the spot size of a single pixel is correct. The scanning deflector 11 may deflect the beamlets 7 over the target surface 24. Therewith, it needs to ensure that the position of a pixel on the target surface 24 is correct on a microscale. Particularly, the operation of the scanning deflector 11 needs to ensure that a pixel fits well into a grid of pixels which ultimately constitutes the pattern on the target surface 24. It will be understood that the macroscale positioning of the pixel on the target surface is suitably enabled by a wafer positioning system present below the target 24.

Such high-quality projection may be relevant to obtain a lithography machine that provides a reproducible result. Commonly, the target surface 24 comprises a resist film on top of a substrate. Portions of the resist film may be chemically modified by application of the beamlets of charged particles, i.e. electrons. As a result thereof, the irradiated portion of the film may be more or less soluble in a developer, resulting in a resist pattern on a wafer. The resist pattern on the wafer may subsequently be transferred to an underlying layer, i.e. by implementation, etching and/or deposition steps as known in the art of semiconductor manufacturing. Evidently, if the irradiation is not uniform, the resist may not be developed in a uniform manner, leading to mistakes in the pattern. Moreover, many of such lithography machines make use of a plurality of beamlets. No difference in irradiation ought to result from deflection steps.

Figure 3:
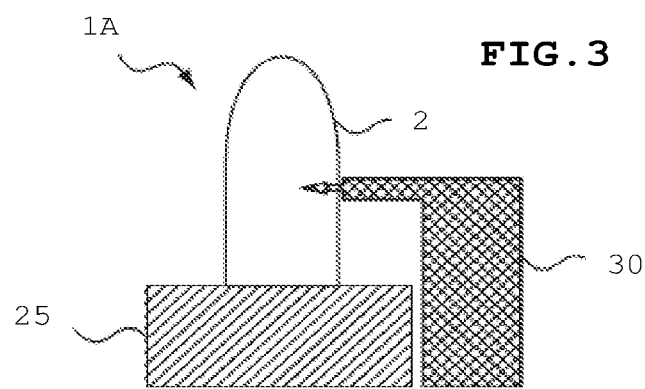
FIG. 3 is a conceptual diagram showing an exemplary maskless lithography system.

FIG. 3 shows a conceptual diagram of an exemplary charged particle lithography system 1A, divided into three high level sub-systems: a wafer positioning system 25, an electron optical column 20, and data path 30. The wafer positioning system 25 moves the wafer 24 under the electron optical column 20 in the x-direction. The wafer position system 25 may be provided with synchronization signals from the data path sub-system 30 to align the wafer with the electron beamlets generated by the electron-optical column 20. The electron-optical column 20 may include the charged particle multi-beamlet lithography machine 1 as shown in FIG. 2. Switching of the beamlet blanker array 9 may also be controlled via the data path sub-system 30, using pattern bitmap data.

In FIGS. 4A-4D exemplary embodiments of a data path sub-system 30 are shown for a lithography system 301A-301D with control and data interfaces forming the data path sub-system 30. The diagrams show a hierarchical arrangement with three interfaces, a cluster interface 303, cluster element interface 305, and the lithography subsystem interfaces 307. Multiple lithography subsystems 316 are shown, each including a charged particle multi-beamlet lithography machine 1 such as shown in FIG. 2. It is possible that there is only on lithography subsystem 316.

Subsystems 316 include, for example, a wafer load subsystem (WLS), wafer positioning subsystem (WPS), an illumination optics subsystem (ILO) for generating electron beamlets, a pattern streaming subsystem (PSS) for streaming beam switching data to the lithography element, a beam switching subsystem (BSS) for switching the electron beamlets on and off, a projection optics subsystem (POS) for projecting beamlets onto the wafer, a beam measurement subsystem (BMS), and a metrology subsystem (MES).

Each subsystem 316 may operate independently and may include a memory for storing instructions and a computer processor for executing the instructions. The memory and processor may be implemented in each subsystem as a plug-in client (PIC) 315. A suitable implementation of a subsystem may include, for example, a personal computer running the Linux operating system. The subsystems may include a hard disk or non-volatile memory for storing their operating system so that each subsystems boots from this disk or memory. These and other features discussed below enable a design where each subsystem may be an autonomous unit which can be designed, built and tested as an independent unit without needing to consider constraints imposed by other subsystems. For example, each subsystem may be designed with sufficient memory and processing capacity to properly perform the functions of the subsystem during its operating cycle, without needing to take into account the demands on memory and processing capacity made by the other subsystems. This is particularly advantageous during development and upgrade of the system, when these requirements are in flux. With this design the total required memory and processing capacity may be increased, and redundancy of these components may need to be implemented within each subsystem. However, the simplified design may lead to faster development and simpler upgrade.

The subsystems 316 may be designed to receive commands via the control network 420 and may execute the commands independently from the other subsystems, reporting results for the command execution and transferring any resulting execution data upon request.

The subsystems 316 may be designed as autonomous units, but designed to boot from a central disk or memory, for example on the data network hub. This reduces the reliability problem and cost of individual hard disks or non-volatile memory in each subsystem, and permits more easy software upgrade of a subsystem by updating the boot image for the subsystem in the central location The cluster interface 303 may comprise interfaces for communication between a lithography cluster front-end 306 and one or more host systems 302, and/or between the cluster front-end 306 and one or more operator consoles 304.

The cluster element interface 305 may comprise interfaces for communication between the cluster front-end 306 and a lithography element network comprising a element control unit 312 and/or a data network hub 314. The element control unit 312 may be in communication with a data network hub 314 via link 406, wherein the communication is preferably uni-directional from the element control unit 312 to the data network hub 314.

The lithography subsystem interface 307 may comprise interfaces between the element control unit 312 and the lithography subsystems 316, and between the data network hub 314 and the lithography subsystems 316. The subsystems 316 may communicate with the element control unit 312 via control network 420, and the subsystems 316 may communicate with the data network hub 314 via data network 421.

The operator interfaces and interfaces to higher-level host supervisory and automation computers may be made not with the individual lithography elements but at the cluster front-end 306.

Preferably the data path 320 directly connects pattern streamer 319 to the subsystem(s) responsible for modulating or switching the charged particle beams. The pattern streamer 319 may stream pattern data to the lithography subsystems 316 to control the modulating and switching of the charged particle beams. The pattern data is typically streamed to the relevant subsystems in a bit-map format, since the quantity of data is too great for local storage at the subsystem.

The subsystems 316 may be connected via a control network to a element control unit 312, also referred to as a Support Subsystem Control or SUSC. The element control unit 312 may comprise memory and a computer processor for controlling operation of the lithography subsystems 316.

Figure 4A:
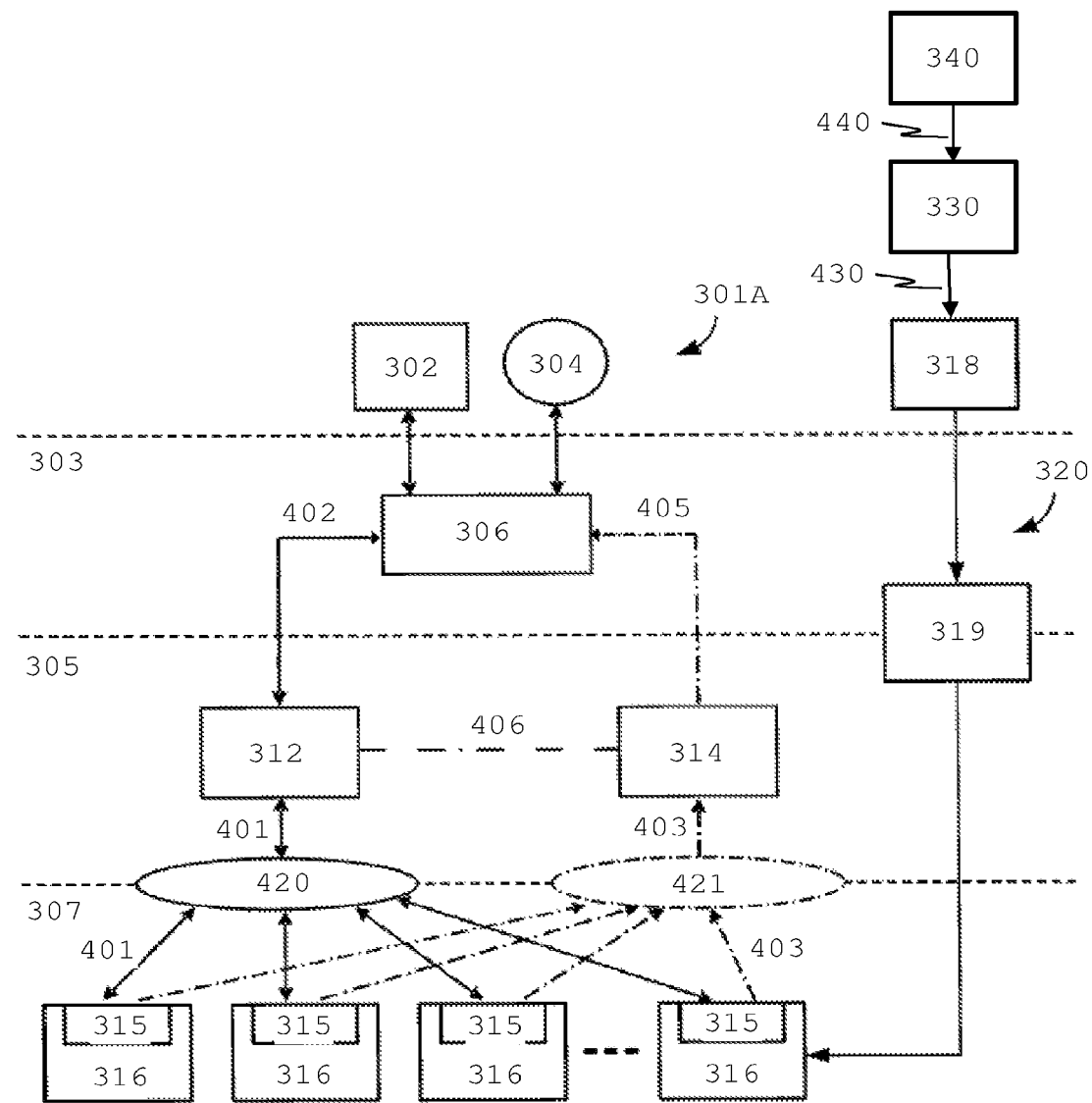
FIGS. 4A-4D are schematic diagrams of exemplary embodiments of a network architecture for a lithography system according to the invention.
Figure 4B:
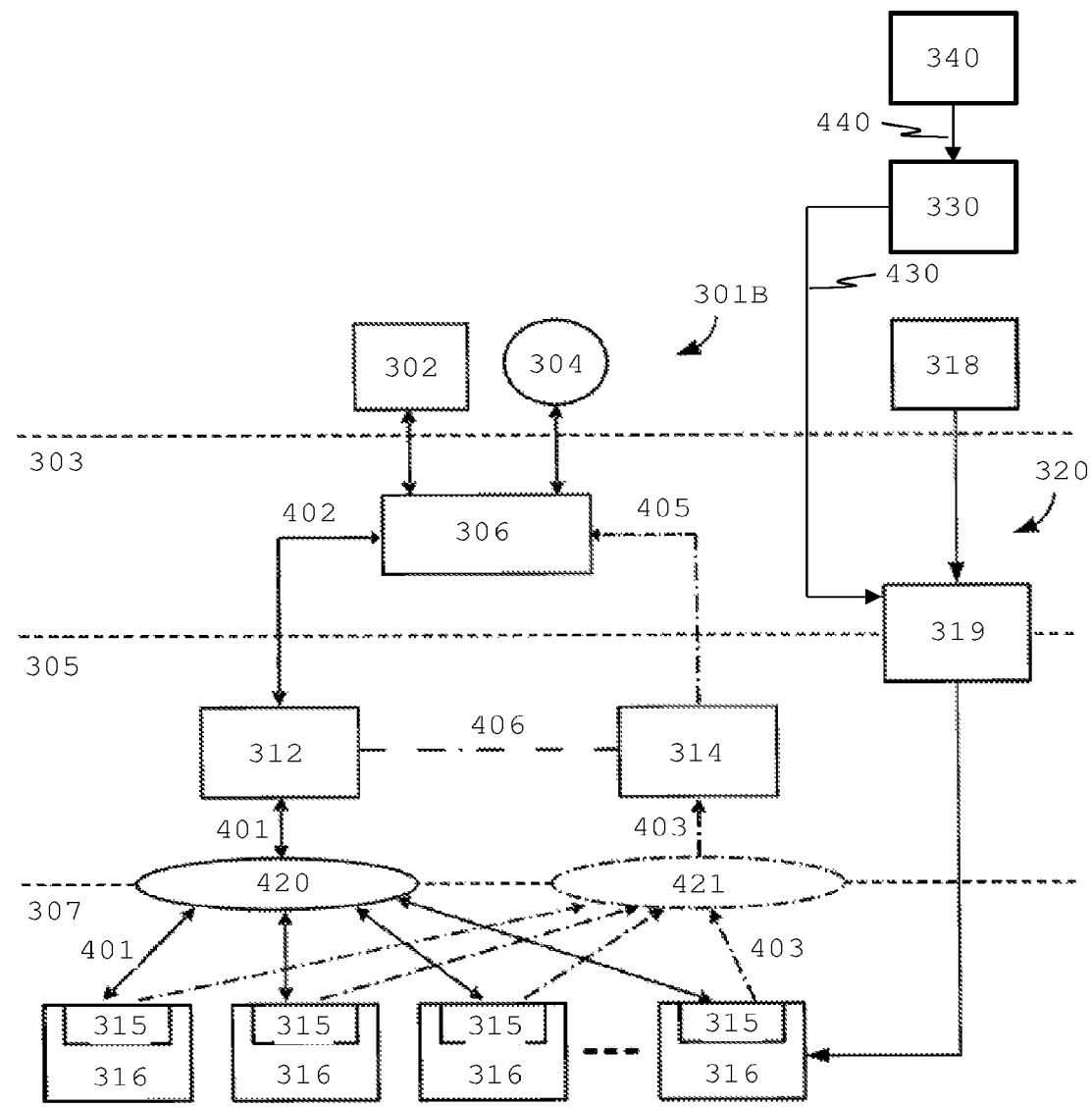

In the examples of FIG. 4A and FIG. 4B the pattern data streamed from the pattern streamer 319 to the lithography subsystem 316 may include the data for the common chip design part and the data for the unique chip design part. In FIG. 4A the unique chip design part may be added to the pattern data in the pattern data processing unit 318. In FIG. 4B the unique chip design part may be added to the pattern data in the pattern streamer 319.

Figure 4C:
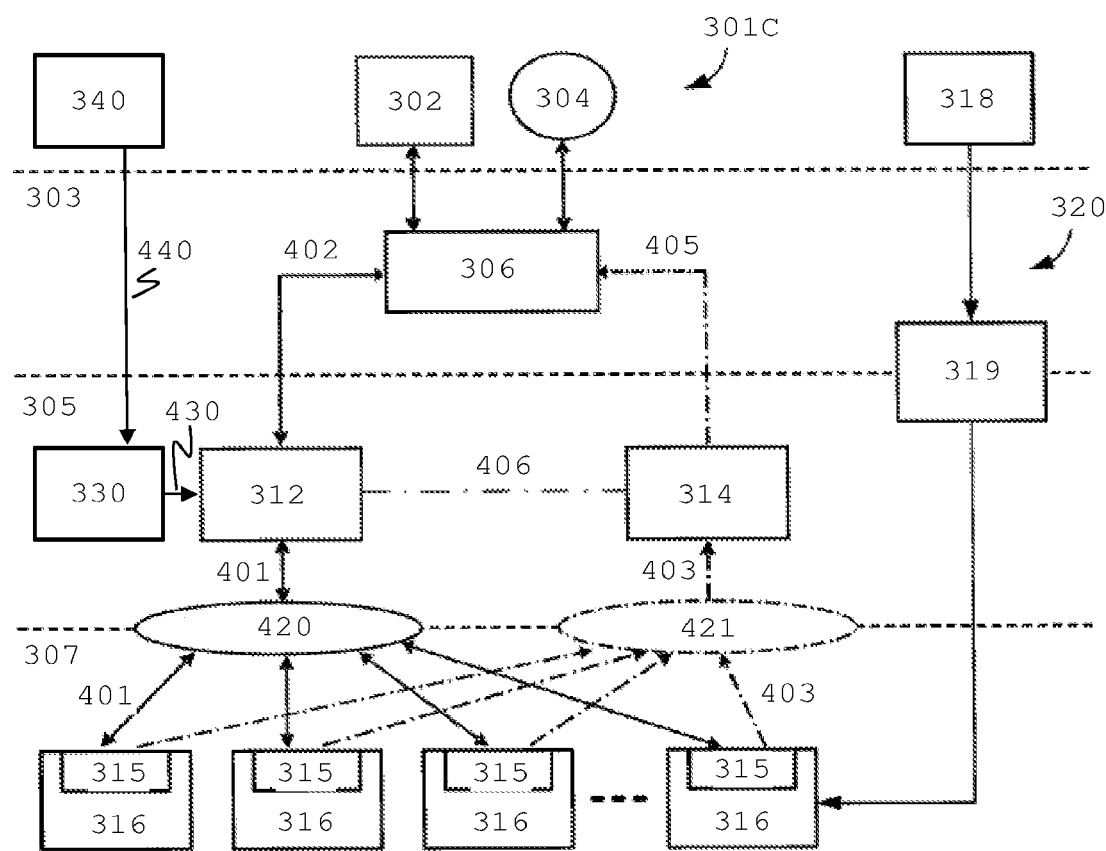
Figure 4D:
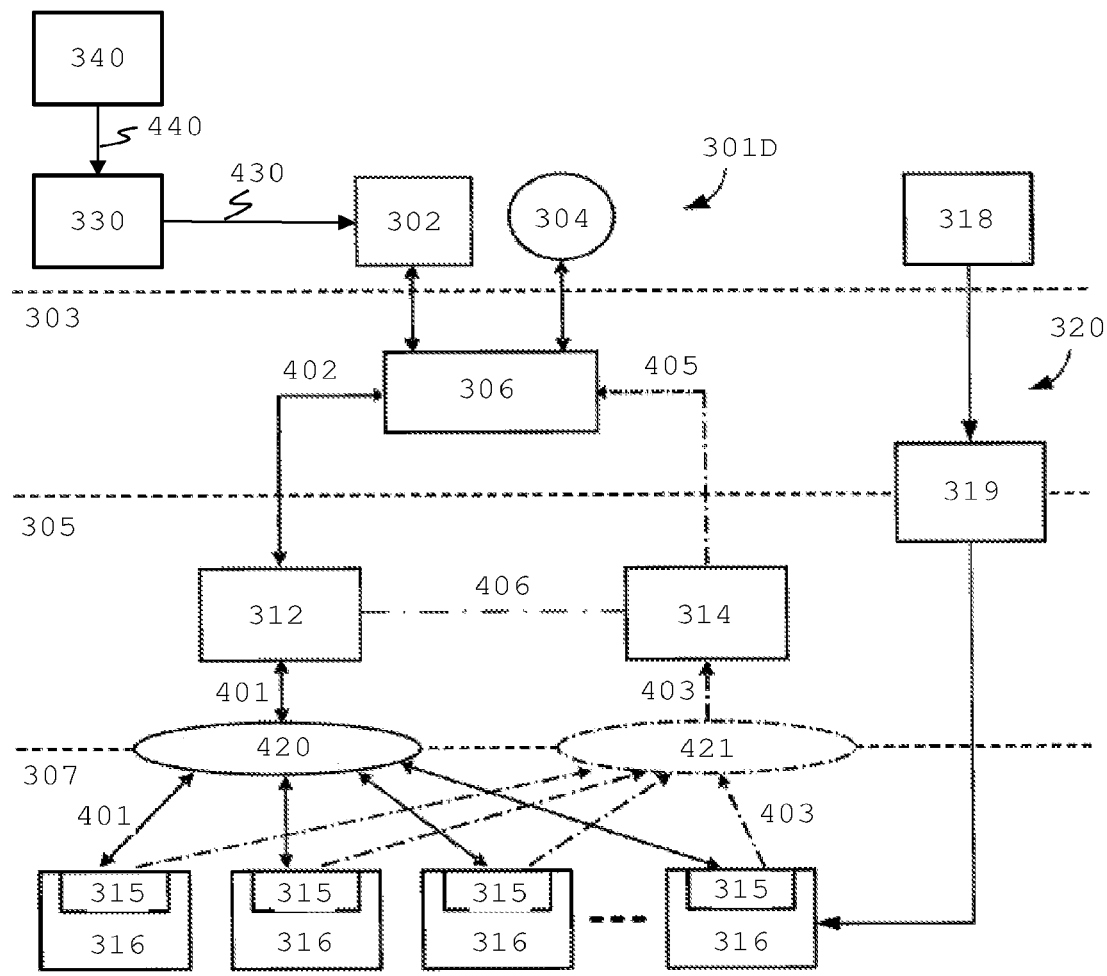

In the examples of FIG. 4C and FIG. 4D the pattern data streamed from the pattern streamer 319 to the lithography subsystem 316 may include the data for the common chip design part. In FIG. 4C the unique chip design part may be added to the pattern data by the lithography subsystem 316 under control of the element control unit 312. In FIG. 4D the unique chip design part may be added to the pattern data by the lithography subsystem 316 under control of the host system 302.

In FIGS. 4A-4D the pattern streamer 319 may be controlled by the element control unit 312 via the control network 420. Furthermore, the pattern streamer 319 may be a part of the lithography subsystem 316.

Figure 5:
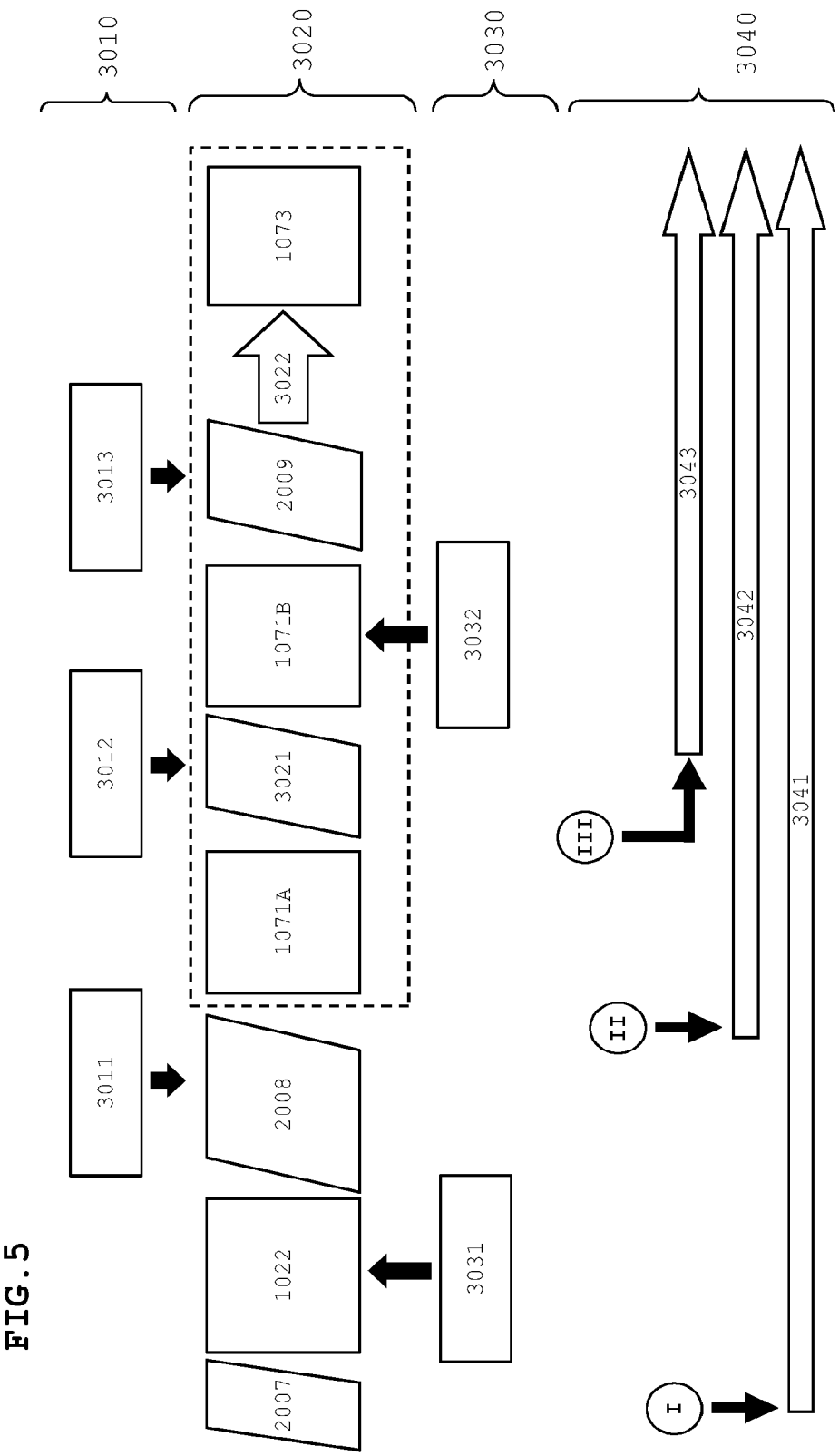
FIG. 5 shows an exemplary functional flow diagram of an embodiment of a data path using real-line rasterization.

FIG. 5 shows an exemplary functional flow diagram of an embodiment of a data path using real-line rasterization. In FIG. 3 the functional flow diagram is split into four sections: 3010 is used to indicate a data format of underlying data outputs/inputs; 3020 shows the process flow including data outputs/inputs (parallelograms) and functional elements (rectangles); 3030 is used to indicate process steps performed at overlying functional elements; and 3040 is used to indicate how often the process steps are typically performed, e.g. once per design 3041, once per wafer 3042 or once per field 3043. Roman I, II and III indicate when the feature data set and/or the selection data may be provided to the data path.

Input to the process may be GDS-II design layout data 2007, or a design layout in any other suitable format such as an OASIS data format, defining the common chip design part. The pattern data processing system 318 may preprocess 1022 the GDS-II file once per design, as indicated by the arrow 3041 at the bottom.

Preferably the preprocessing 1022 does not involve the unique chip design part, enabling the pattern data preprocessing system 318 to be located at a less secured environment. It is also desirable to minimize exposure time of the unique chip design part for security reasons. The security aspect is important as the uniqueness of the chip will typically be used for data security, traceability and anti-counterfeiting applications. The processes within the dashed block, i.e. from software processing 1071A until hardware processing 1073 are typically performed at the lithography machine 1,1A enabling a more secure operating environment. By inserting the unique chip design part at a later stage, the amount of time that the code is used within the lithography system 301A-301D can be minimized.

The unique chip design part may be inserted into the pattern data at various stages in the functional flow, indicated by roman I, II and III.

The unique chip design part may be inserted into the pattern data upon processing of the design layout data input, in this example GDSII input, indicated by roman I. At this stage the pattern data processing is typically performed in a vector based data format. As this operation is typically performed at the pattern data processing unit 318 located in a less secure environment, insertion of the unique chip design part at this stage I is least preferred.

More preferably the insertion of the unique chip design part into the pattern data may be performed at the software processing stage 1071A as indicated by roman II, or at the streaming stage 1071B as indicated by roman III. The S/W processing stage 1071A is typically performed once per wafer, as indicated by the second arrow 3042 from the bottom. The streaming stage 1071B is typically performed once per field or once per chip, as indicated by the third arrow 3043.

The S/W processing stage 1071A and the streaming stage 1071B may be implemented at the pattern streamer 319. The hardware processing stage 1073 on the right side of the functional flow typically involves the blanker being controlled by the pattern data 2009 including the common chip design part and the unique chip design part.

The GDS-II format pattern data may undergo off-line processing 1022, typically including proximity effect correction, resist heating correction, and/or smart boundaries (jointly depicted 3031). The resulting corrected vector pattern data 2008 may be in a vector format an may include dose information, depicted as 3011. This off-line processing 1022 is usually performed once for a given pattern design, for one or more batches of wafers. In case of inserting the unique chip design part at this stage, indicated by roman I, the off-line processing 1022 may need to be performed more frequently, up to once per wafer or even once per field or chip.

Next, in-line processing of the vector tool input data 2008 may be performed to rasterize the vector data 2008 to generate pattern system streamer (PSS) bitmap data 3021 in e.g. a 4-bit greyscale bitmap format 3012.

This processing is typically performed in software. The unique chip design part may be added at this stage, as indicated by roman II. The pattern streamer 319 may then processes the PSS format data 3021 to generate blanker format data 2009, possibly including corrections involving a full or partial pixel shift in the X and/or Y direction for beam position calibration, field size adjustment, and/or field position adjustment as before on the bitmap data, jointly depicted 3032. Alternatively to entry point II, the unique design part may be added at this stage as indicated by roman III. This processing may be performed per field. The blanker format pattern data 2009 may then be transmitted 3022 to the lithography system for exposure of the wafer.

As indicated in FIG. 5, rasterization may be performed at the streaming stage 1071B, which typically involves real-time processing performed in hardware. Corrections for beam position calibration, field size adjustment, and/or field position adjustment 3032 may be performed on vector format PSS format data 3021, and then rasterization may convert this to a blanker format 2009. When the corrections are made on vector data, both full pixel shifts and subpixel shifts in the X and Y direction can be made.

The pre processing 1022 of the GDSII input 2007 is preferably performed such to enable insertion of the unique chip design part at a later stage. Hereto bit space may be reserved within intermediate pattern data or place holders may be added to intermediate vector format data where the unique chip design data is to be inserted at a later stage. Advantageously, besides the mentioned security advantage, this avoids the need to regenerate huge amounts of pattern data before each exposure of the wafer for each unique chip, which would require very high CPU power and very large amounts of memory.

In FIGS. 4A-4D communication 402 between the cluster front-end 306 and SUSC 312 may be designed for transfer of process programs (PPs) to the SUSC 312. A protocol based on JavaScript Object Notation (JSON) may be used for this purpose. The protocol preferably provides an instruction for creation of process jobs (PJs), transferring the PP file and any associated parameters, to instruct the SUSC 312 to create a PJ based on the PP. Additional commands may include Abort and Cancel instructions.

Communication from the SUSC 312 to the cluster front-end 306 may include acknowledgment messages, progress reporting, and error and alarm messages.

Communication 401 between the SUSC 312 and lithography subsystems 316 across control network 420 is preferably strictly controlled using only the element control unit protocol to ensure a quasi real-time performance in the network. Communication 405 between SUSD 314 and cluster front-end 306 may be designed for retrieval of PJ results, job tracing and data logging from the SUSD 314. A Hyper-Text Transfer Protocol (HTTP) may be used for this communication link.

Communication 403 between the lithography subsystems 316 and SUSD 314 may be designed for one-way collection of data from the subsystems 316. The data may be communicated using a variety of protocols, such as syslog, HDF5, UDP and others.

High volume data may be sent using a User Datagram Protocol (UDP) to send data without the large overhead of handshaking, error checking and correction. Due to the resulting very low transmission overhead, the data may thus be regarded as being received in real-time.

The hierarchical data format HDF5 may be used for transmission and storage of the high-frequency data. HDF5 is well suited to storing and organizing large amounts of numerical data, but is usually not used in a UDP environment. Other data formats such as CSV or TCP can also be used, particularly for low level (low volume) data.

The operation of the lithography subsystems 316 may be controlled using the PP, which may comprise a sequence of actions to be performed. The element control unit 312 may be loaded with a PP, and may schedule and execute the PP as requested by a host system 302 or an operator though an operator console 304.

Process programs (PP) and process jobs (PJ) may be based on the SEMI standard, e.g. SEMI E30: "Generic Model for Communications and Control of Manufacturing Equipment (GEM)", SEMI E40: "Standard for Processing Management", SEMI E42: "Recipe Management Standard: Concepts, Behavior, and Message Services", and/or SEMI E139: "Specification for Recipe and Parameter Management (RaP)". The PP may take the role of a recipe, e.g. as defined in the SEMI E40 standard. Although the SEMI standards specify many requirements on how to deal with recipes, the standards may be contradictory so that recipes are preferably avoided. Instead, editable and unformatted PP may be used in the form of so-called Binary Large Objects (BLOBs).

The PP may be a pre-planned and reusable portion of the set of instructions, settings and parameters that determine the processing environment of the wafer and that may be subject to change between runs or processing cycles. PPs may be designed by the lithography tool designers or generated by tooling.

PPs may be uploaded to the lithography system by the user. PPs may be used to create PJs. A PJ may specify the processing to be applied to a wafer or set of wafers by a lithography subsystem 316. A PJ may define which PP to use when processing a specified set of wafers and may include parameters from the PP (and optionally from the user). A PJ may be a system activity started by a user or host system.

PPs may be used not only for controlling the processing of wafers, but also for service actions, calibration functions, lithography element testing, modifying element settings, updating and/or upgrading software. Preferably no subsystem behavior occurs other than what is prescribed in a PP, with the exception of certain allowed additional categories, such as automatic initialization during power-up of a module or subsystem, periodic and unconditional behavior of a subsystem, as far as those don't influence PJ execution, and the response to an unexpected power-off, emergency or EMO activation.

A PP may be divided into steps. Most steps comprise a command and identify a subsystem which is to perform the command. The step may also include parameters to be used in performing the command, and parameter constraints. The PP may also include scheduling parameters to indicate when a step is to be performed, e.g. to be performed in parallel, in sequence, or synchronized.

To execute a command step of the PJ, the element control unit 312 may send the command indicated in the PJ to the subsystem indicated in the relevant step of the PJ. The element control unit 312 may monitor timing and may receive the results from the subsystem.

In the example of FIG. 4A the pattern data processing system 318 may be configured to receive unique chip design data 430 from a unique data generator 330 and to insert the unique chip design data into the pattern data.

In the example of FIG. 4B the pattern streamer 319 may be configured to receive unique chip design data 430 from a unique data generator 330 and to insert the unique chip design data into the pattern data.

In the example of FIG. 4C the element control unit 312 may be configured to receive unique chip design data 430 from a unique data generator 330 and to control insertion of the unique chip design data into the pattern data. The unique chip design data may be transmitted to a lithography subsystem 316 with a process job.

In the example of FIG. 4D the host system 302 may be configured to receive unique chip design data 430 from a unique data generator 330 and to control insertion of the unique chip design data into the pattern data. The unique chip design data may be transmitted to a lithography subsystem 316 with a process job.

Generally, the unique chip design data 430 may be in a format that enables direct insertion into the pattern data. Alternatively the unique chip design data 430 comprises information that enables the data to be generated that is to be inserted into pattern data.

The unique chip design data 430 may be generated by the unique data generator 330 based on secret data 440 received from an external provider 340. Alternatively the secret data may be generated within the unique data generator 330. The secret data 440 may be encrypted and decryptable by the unique data generator 330. The secret data 440 may include secret keys and/or secret IDs.

The unique data generator 330 may be realized as a black box device. The unique chip design data 430 may be generated by the back box device. The black box device may be a source external to the maskless lithographic exposure system and is preferably located within a manufacturing part of the fab. The black box may be owned by a third party, e.g. an IP block owner or the owner of the manufactured chip, or a key management infrastructure owner. Advantageously the black box can be located within the fab close to the operations of the lithography machine, thereby minimizing public exposure of the unique chip design data. This in contrast to known chip manufacturing solutions, where a black box for individualizing chips is typically located outside of the fab and used to individualize the chips after being created.

A black box device may include an ID/key manager and a unique data generator 330 that cooperate in the creation of the unique chip design data 430. The ID/key manager may receive product ID/serial number information from a manufacturing database and batches of ID/key pairs from a key management service possibly located outside of the maskless lithographic exposure system. The product ID/serial number information and the batches of ID/key pairs may be used to control the generation of the unique chip design data 430. Furthermore, the product ID/serial number information may be used to track the chips through the creation process to be able the chips to be matched with their ID/serial numbers after being created. Alternatively or additionally, the product ID/serial number information may be used to include the ID/serial number in or on the chip by a not shown but known per se process.

Figure 6:
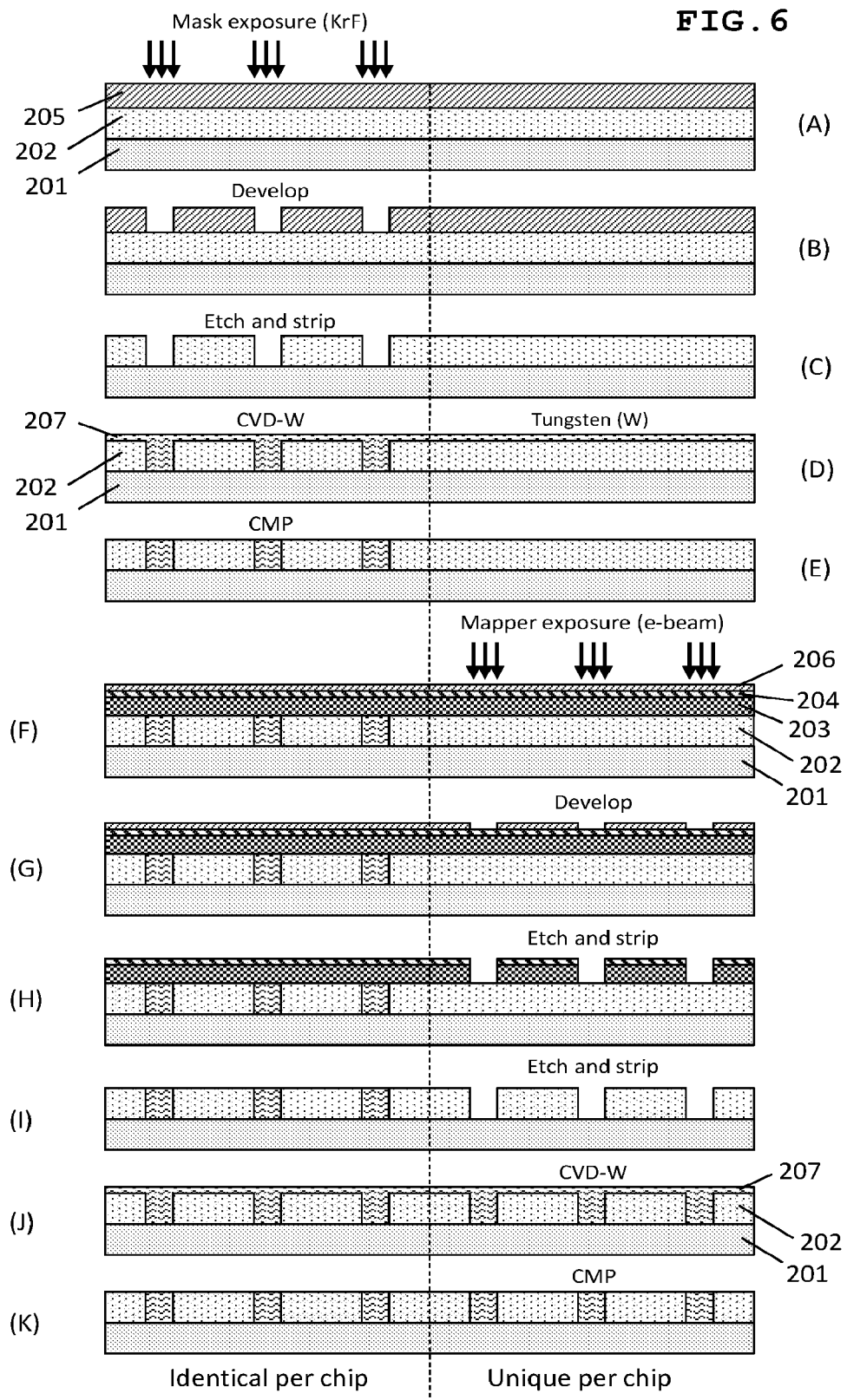
FIG. 6 shows a process of creating a unique chip according to an exemplary embodiment of the invention.

FIG. 6 shows a process of creating a unique chip according to an exemplary embodiment of the invention. In this embodiment the identical part of the chip may be created using photolithography (using a mask) and the individualized (unique) part of the chip may be created using charged particle multi-beamlet lithography (without a mask). Mask-based photolithography is the conventional method for making chips, and at the present time enables low cost and high throughput production using conventional lithography equipment already in service at a typical fab. However, using mask-based lithography for making unique chips is impractical because this would require a large number of (expensive) masks, each having a different pattern. Maskless lithography using e.g. a charged particle multi-beamlet lithography system is a newly developed technology which has not yet been commercialized widely and still cannot achieve the same high throughput of mask-based systems.

Using a combination of mask-based and maskless lithography enables low cost and high throughput production of unique chips. Various methods may be used for combining mask-based and maskless lithography to create the unique chips. Some examples are discussed with reference to FIGS. 6-8 below. These examples illustrate processes for fabricating a unique pattern of conducting vias for interconnecting two conducting layers of the chip. However, the portion of the chips which is individualized to create the unique chips may be layers other than a via layer. For example, a semiconductor layer may be individualized by creating a unique arrangement of transistors and diodes in each chip by varying the doping of active regions of the transistors or diodes. This variation in doping is very hard to detect even when shaving the chip and analyzing each layer, since the variation in amount of dopant in the semiconductor layer is difficult to detect, making the chip very difficult to reverse engineer. In other examples, a contact layer may be individualized by forming a unique arrangement of connections between a metal layer and a gate, or a metal layer may be individualized by forming a unique arrangement of connections between circuit elements, or these examples may be used in combination of other features of the circuit may be selectively formed in a unique combination for each chip to realize the unique chips.

At the beginning of the process of FIG. 6 the wafer may comprise a bottom metal layer 201 which has been previously patterned to form conductive connecting lines and an insulating layer 202 (for example SiO2) with resist 205 (e.g. KrF resist) on top as shown in FIG. 6A.

For the creation of the identical part (e.g. common part 101), the resist 205 may undergo a mask-based exposure, e.g. using a KrF laser, followed by a development step wherein patterns defined by the mask are removed from the resist layer 205, as shown in FIG. 6B. In an etching and stripping step these patterns may be etched into the insulating layer 202 and the resist is then removed, as shown in FIG. 6C.

Next, a conductive layer 207 may be applied onto the etched and stripped insulating layer, as shown in FIG. 6D. For example a chemical vapor deposition with Tungsten (CVD-W) may be used, as shown in FIG. 6D. Chemical-mechanical planarization (CMP) may be used to remove superfluous conductive material resulting in the wafer having the bottom metal layer 201 and a layer 202 comprising insulating material with conductive material present in the locations where conductive vias are desired, as defined by the mask exposure, shown in FIG. 6E.

Next, for the creation of the unique part 102, the wafer may receive one or more etch barrier films for etching the insulating layer 202. For example, a spin on carbon (SOC) film 203 and a silicon-containing antireflective coating (SiARC) hard mask 204, with an e-beam resist 206 formed on top, covering the insulating layer 202 including the etched part from the mask-based photolithography phase, as shown in FIG. 6F. The resist 206 may undergo a maskless e-beam exposure followed by a development step wherein patterns exposed by the e-beams are removed from the resist 206, as shown in FIG. 6G. In an etching and stripping step these patterns may be etched into the etch barrier films 203 and 204, and the resist may be removed, as shown in FIG. 6H. Next, the patterns that are created in etch harrier films 203, 204 may be etched into the insulating layer 202, and films 203, 204 may be stripped, as shown in FIG. 6I.

Next, a conductive layer 207 may be applied onto the etched and stripped insulating layer 202, as shown in FIG. 6J. For example a chemical vapor deposition with Tungsten (CVD-W) may be used. Chemical-mechanical planarization (CMP) may remove superfluous conductive material, as shown in FIG. 6K, resulting in the wafer having a bottom metal layer 201 and a layer 202 comprising insulating material with conductive material present in the locations where conductive vias are desired, as defined by the mask exposure and the maskless exposure, as shown in FIG. 6K. The locations for the conductive vias defined by the mask exposure will be the same for every chip of the set of chips made using the same mask. However, the locations for the conductive vias defined by the maskless exposure may be different for every chip of the set of chips, so that every chip of the set has a unique set of vias.

Following the process of FIG. 6, an upper metal layer may be deposited over insulating layer 202 and patterned to create a second set of conductive connecting lines, so that the vias formed in insulating layer 202 function as electrical connections between the bottom metal layer 201 and the upper metal layer. Since each chip of the set of chips has a unique arrangement of vias, each chip can be designed to have a unique electrical circuit.

Figure 7:
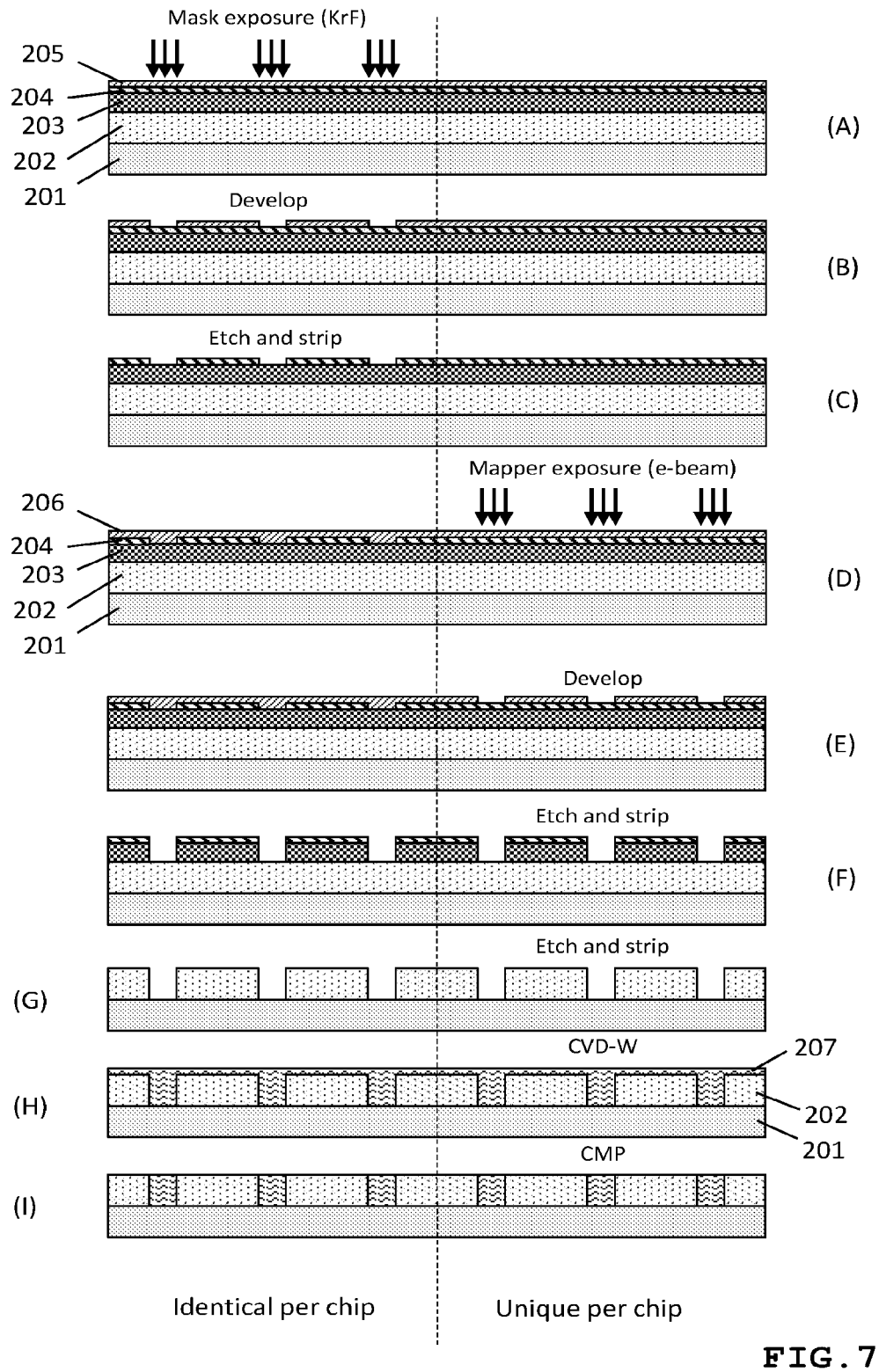
FIG. 7 shows a process of creating a unique chip according to another exemplary embodiment of the invention.

In the embodiment of FIG. 6 two CMP steps may be needed. Dishing and double erosion effects caused by the CMP steps can affect the thickness of the insulating layer including the conductive material of the vias. This can have a negative impact on analogue and radio frequency performance of the chip. FIG. 7 shows an improved process for creating unique chips wherein only a single CMP step may be needed.

FIG. 7 shows a process of creating a unique chip according to another exemplary embodiment of the invention. In this embodiment the identical part (e.g. common part 101) of the chip may be created using mask-based photolithography and the individualized part (e.g. unique part 102) of the chip may be created using maskless charged particle multi-beamlet lithography.

At the beginning of the process of FIG. 7 the wafer may comprise a bottom metal layer 201 which has been previously patterned to form conductive connecting lines, and an insulating layer 202 (for example SiO2), under etch barrier films 203 and 204 (e.g. SOC+SiARC HM) and a resist 205 (e.g. KrF resist), as shown in FIG. 7A. Advantageously, the etch barrier films 203 and 204 may be used for both the mask-based photolithography and the maskless charged particle multi-beamlet lithography phase, thereby eliminating the need for a CMP step in the photolithography phase, as will be further explained below.

For the creation of the identical part, the resist 205 may undergo a mask exposure, e.g. using KrF laser, followed by a development step wherein patterns defined by the mask may be removed from the resist 205, as shown in FIG. 7B. In an etching and stripping step these patterns may be etched into the SOC 204 and the resist is removed, as shown in FIG. 7C.

Next, for the creation of the unique part, the wafer may receive an e-beam resist 206, covering the etch barrier films 203 and 204 including the etched part from the photolithography phase, as shown in FIG. 7D. The resist 206 may undergo an e-beam exposure followed by a development step wherein patterns defined by the e-beams may be removed from the resist 206, as shown in FIG. 7E. In an etching and stripping step these patterns may be etched into the etch barrier films 203, 204 and the resist 206 is removed, as shown in FIG. 7F. Next, the patterns created in the etch barrier films 203, 204 in both the mask-based photolithography phase and the maskless charged particle multi-beamlet lithography phase may be etched into the insulating layer 202, and the films 203, 204 may be stripped as shown in FIG. 7G.

Next, a conductive layer 207 may be applied onto the etched and stripped insulating layer 202 for both the identical part and the unique part of the chip, as shown in FIG. 7H. For example a chemical vapor deposition with Tungsten (CVD-W) may be used. Chemical-mechanical planarization (CMP) may remove superfluous conductive material resulting in the wafer having the bottom metal layer 201 and a layer 202 comprising insulating material with conductive material at locations defined by the mask exposure and the maskless exposure, as shown in FIG. 7I.

As described with reference to FIG. 6, an upper metal layer may be deposited over insulating layer 202 and patterned to create a second set of conductive connecting lines, so that the vias formed in insulating layer 202 function as electrical connections between the bottom and upper metal layers. Since each chip of the set of chips has a unique arrangement of vias, each chip can be generated having a unique electrical circuit.

Figure 8:
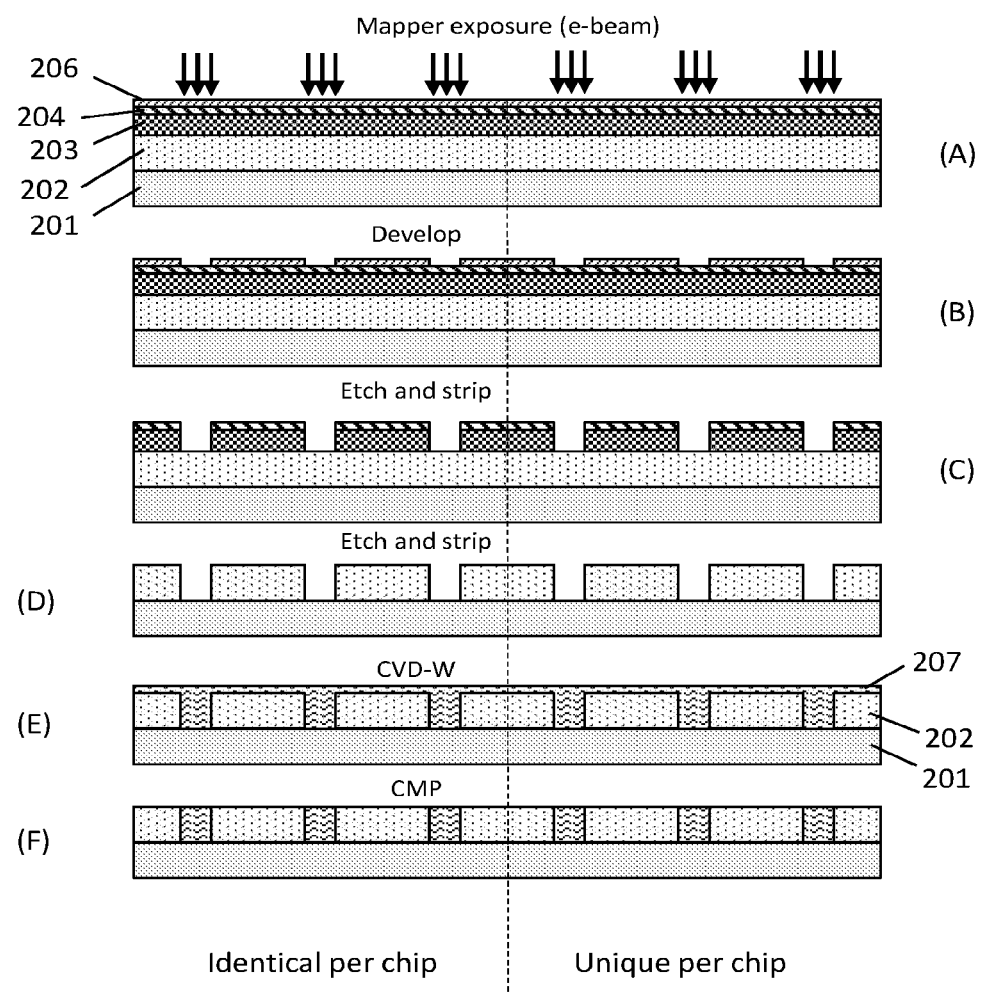
FIG. 8 shows a process of creating a unique chip according to another exemplary embodiment of the invention.

FIG. 8 shows a process of creating a unique chip according to another exemplary embodiment of the invention. In this embodiment, all or a portion of the identical part (e.g. common part 101) of the chip as well as the unique part 102 of the chip may be created using maskless charged particle multi-beamlet lithography.

At the beginning of the process of FIG. 8 the wafer may comprise a bottom metal layer 201 which has been previously patterned to form conductive connecting lines, and an insulating layer 202 (for example SiO2), under etch barrier films 203 and 204 (e.g. SOC+SiARC HM) and an e-beam resist 206 (e.g. KrF resist), as shown in FIG. 8A.

The resist 206 may undergo an e-beam exposure followed by a development step wherein patterns defined by the e-beams may be removed from the resist layer 206, as shown in FIG. 8B. In an etching and stripping step these patterns may be etched into the etch barrier films 203, 204 and the resist 206 may be removed, as shown in FIG. 8C. Subsequently the patterns may be etched into the insulating layer 202, and the etch barrier films 203, 204 are stripped, as shown in FIG. 8D.

Next, a conductive layer 207 may be applied onto the etched and stripped insulating layer 202 for both the identical part and the unique part of the chip, as shown in FIG. 8E. For example a chemical vapor deposition with Tungsten (CVD-W) may be used. Chemical-mechanical planarization (CMP) may remove superfluous conductive material resulting in the wafer having the bottom metal layer 201, and a layer comprising insulating material with conductive material formed at locations as defined by the e-beams, as shown in FIG. 8F.

An advantageous method for combining the use of mask-based lithography and maskless lithography for the production of unique chips is to arrange the individualized portion of the chips on a single layer of the chip, e.g. on a single via layer, contact layer, other metal layer, or semiconductor layer. The entire layer containing the individualized structures (e.g. vias, contacts, connecting lines, transistors etc.) may then be exposed using maskless/e-beam lithography, while all of the other layers are exposed using conventional mask-based photolithography.

Figure 9:
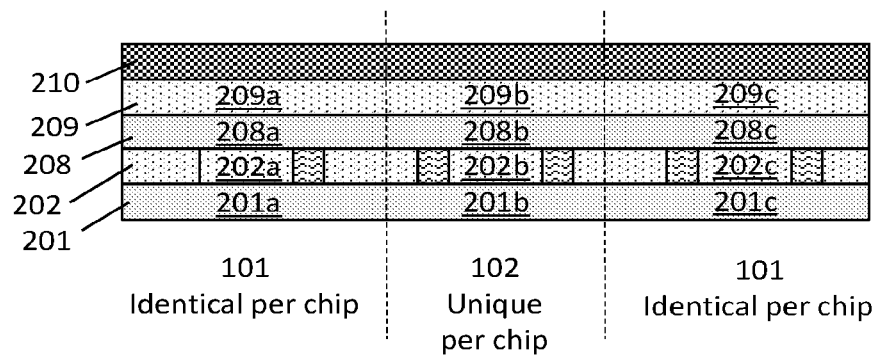
FIG. 9 shows a method for combining mask-based and maskless lithography for creating a unique chip according to another exemplary embodiment of the invention.

This is illustrated in the embodiment shown in FIG. 9 showing various layers of a unique chip. In this example, the chip can be considered to have common parts 101 and a unique part 102 in different areas of the chip. These parts 101, 102 are formed of multiple layers, and the structures (such as interconnecting lines, vias, terminals of transistors and diodes, active regions of transistors and diodes etc.) formed in the common parts 101, 102 may form electrical circuits such as logic circuits and data storage (memory) circuits or data storage structures. The structures formed in the common parts 101 are common structures which are the same in every chip of the set of chips. The common structures of the common parts 101 are indicated in FIG. 9 as 201a, 202a, 208a, 209a, 201c, 202c, 208c and 209c. The structures formed in the unique (non-common) part 102 may be a mix of common structures which are the same in every chip of the set of chips (indicated in FIG. 9 as 201b, 208b and 209b) and non-common structures which are unique for each chip (indicated in FIG. 9 as 202b).

In this example, layers 201, 208 and 209 are exposed using mask-based lithography and are designed to be identical for every chip of the set, i.e. these layers include common structures (201a-c, 208a-c and 209a-c) which are identical for all chips of a set of chips. The electrical circuits formed by these common structures are thus identical in every chip.

Layer 202 is exposed using maskless lithography and is different for each chip of the set of chips. Note that the portions of layer 202 within the common part 101 contains common structures (202a and 202c) which are identical for every chip, while the portions of layer 202 within the unique part 102 contain non-common structures (202b) which are unique for each chip. In this way, a unique circuit (also referred to as a non-common circuit) for each chip can be created in the unique part 102. For example, the chip may have transistors, diodes and connecting lines which are identical for every chip but a unique arrangement of conducting vias in layer 202 which results in forming a unique circuit in the unique part 102 for each chip.

Note that the individualized portion of the chips may also be formed on two or more layers of the chip which are exposed using maskless lithography, while the remaining layers are exposed using mask-based lithography.

The layer of the chip which contains the individualized structures, e.g. the non-common structures 202b of FIG. 9, preferably has one or more other layers formed above the individualized layer, and may have one or more other layers formed below the individualized layer. This makes it more difficult to determine the structures of the individualized portion of the chip by non-destructive inspection, particularly where there are several layers above the individualized layer and/or the overlying layers include structures or materials which are difficult to penetrate during inspection. This also applies when the individualized structures are formed on more than one layer, so that at least one of the individualized layers preferably has one or more overlying layers and may have one or more other layers below.

Figure 12A:
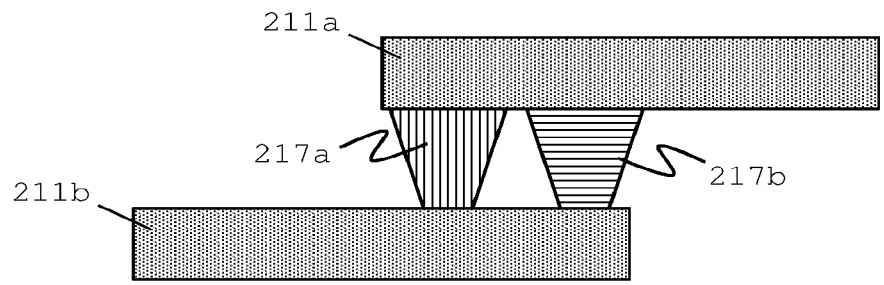
FIGS. 12A-D shows a conducting via formed using a conventional process and a maskless lithography process according to another exemplary embodiment of the invention.
Figure 12B:
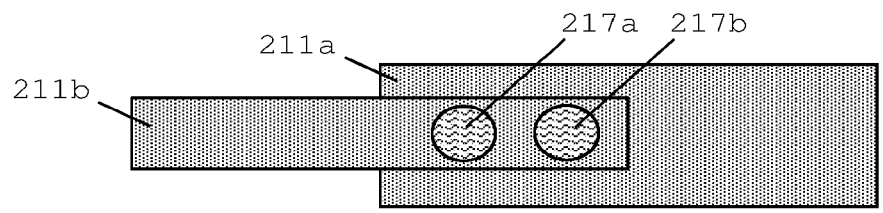
Figure 12C:
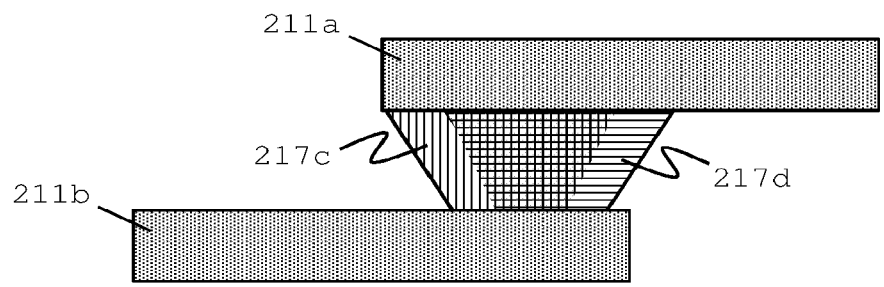
Figure 12D:
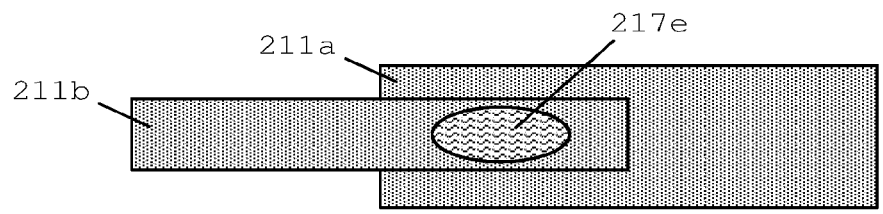

The embodiments of FIGS. 6-8 are described above using the example of individualized part of the chip comprising a unique arrangement of conducting vias formed using maskless lithography. The structure of the unique chips may be further improved by merging adjacent conducting vias produced using the maskless lithography process to effectively form a larger single via, as depicted in the example shown in FIG. 12A-D. FIG. 12A shows a side view and FIG. 12B shows a top view of multiple round vias 217a, 217b formed using a conventional mask-based photolithography process, to form an electrical connection between two metal layers 211a, 211b. Due to the limitations of the optical systems used in conventional photolithography, the merging of these vias into a single larger oblong via is difficult to achieve in practice. Using a maskless charged particle lithography system, these constraints are not present and a larger oblong single via can be 217e produced connecting metal layers 211a, 211b, e.g. by exposing two vias 217c, 217d close together so that they merge to form a double via, as shown in FIGS. 12C and 12D showing side and top views respectively. This double via enables a more reliable connection to be made between the two metal layers, which may conduct more current, and yields a further improvement in the unique chip.

In the embodiments of FIG. 6 and FIG. 7 the unique part of the chip or the layer(s) containing the individualized features/structures may be generated based on pattern data including a common chip design part and a unique chip design part, as discussed in conjunction with FIGS. 4A-5. The size of the common chip design part may depend on the size of the identical part of the chip created using photolithography. When a large portion of the identical part is exposed using photolithography, the common chip design part in the pattern data may be small. It is possible that the pattern data only includes a unique chip design part in case the unique part of the chip only or mostly has unique features.

In the embodiment of FIG. 8 the pattern data may include a common chip design part that is used to create the identical part of the chip and a unique chip design part that is used to create the unique part of the chip, as discussed in conjunction with FIGS. 4A-5. In the embodiment of FIG. 9 the pattern data may include a common chip design part that is used to create the identical part of the individualized layer and a unique chip design part that is used to create the unique part of the individualized layer, as discussed in conjunction with FIGS. 4A-5.

A predetermined value, such as a serial number or any other kind of identification code may be embedded in a chip using a maskless lithography exposure system, such that it becomes readable from the chip electronically, optically or magnetically by automated means. In the following examples a serial number is used as non-limiting example of a predetermined value.

Figure 10:
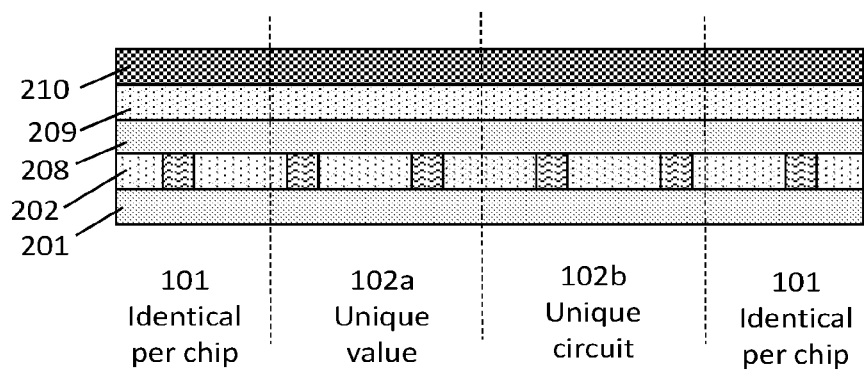
FIG. 10 shows a unique chip having a unique part including a unique circuit and associated unique predetermined value according to another exemplary embodiment of the invention.

FIG. 10 shows an embodiment of a unique chip comprising a unique chip having multiple layers and including a common part 101 and a unique part 102, which may be formed using any of the methods described above. In this example, the unique part comprises a first portion 102a and a second portion 102b on a layer 102, where the first portion 102a stores a predetermined value which is uniquely associated with the second portion 102b.

In one embodiment, the first portion 102a forms a mask ROM which stores a serial number and the second portion forms a circuit which generates a predetermined output value when provided with a predetermined input value, where the output value is different for every chip of the set of chips when provided with the same input value, or where each chip of the set of chips generates a unique combination of output value to input value. The serial number stored in the first portion 102a is uniquely associated with the circuit formed by the second portion 102b. The serial number may be readable from an output of the chip, so that the unique chip can be identified by reading the serial number. An input value may be provided to the circuit of the chip and the resulting output value generated by the circuit may be read from the chip. Then the serial number and the output value read from the chip may be evaluated to securely determine the identity of other information about the chip.

Figure 11:
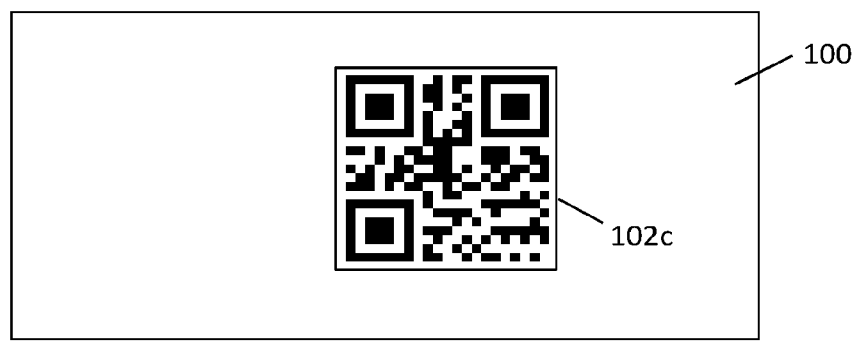
FIG. 11 shows a unique chip having a layer storing a unique predetermined value according to another exemplary embodiment of the invention.

An electronically readable serial number may be read from the chip e.g. via one or more ports or pins connected a chip's electronic circuit or wirelessly e.g. using a NFC or Bluetooth interface connected to the chip's electronic circuit. An optically readable serial number may be written on a metal layer of the chip. The shape of the metal layer may be used to encode the serial number, e.g. in the form of a small bar code or QR code, or an optically identifiable set of metal lines, vias, or circuitry. FIG. 11 shows a top view of a layer of an exemplary semiconductor chip 100 having a shape which stores a serial number in a unique portion 102c, in this example in the form of a QR code which may be optically readable. The portion 102c with the QR code may form part of a first portion 102a as shown in FIG. 10, or part of a circuit formed by a second portion 102b as shown in FIG. 10. Such a readable serial number may be read using an optical reader scanning the surface of the chip, possibly thereby penetrating one or more of the upper layers of the chip to access the serial number on an embedded chip layer. An optically readable serial number that is written on a chip layer that is covered by one or more other chip layers may be read using a reader that can penetrate the chip, such as an electron microscope or x-ray machine.

Multiple serial numbers or identification codes may be embedded in a chip. Multiple serial numbers may be written on the same chip layer, e.g. the same metal layer, or on different chip layers. It is possible that one or more serial numbers can be read electronically from the chip while on or more other serial numbers can be read optically from the chip. The multiple serial numbers may be different serial numbers, copies of the same serial number in a same format or copies of the same serial numbers in different formats. Non limiting examples of formats are: sizes; ways of representing the serial number; encrypted and unencrypted forms of the same serial number.

The serial number may be used to create a unique association between the unique chip and software code. The software code may be accessible or usable only with the correct or verifiable serial number in the unique chip. Preferably, the software code is embedded in the chip, e.g. in ROM created with the same maskless lithography exposure system as used for embedding the serial number. The software code may be external to the chip.

The serial number may be used in an authorization process that is tied to a challenge-response circuitry embedded in the chip, preferably created using the same maskless lithography exposure system as used for embedding the serial number. The serial number may be read from the chip and used to obtain a challenge and response pair e.g. from a database. This response is the expected response to the challenge and should be securely stored. This challenge and response pair may be predefined and tied to the serial number upon fabrication of the chip using the maskless lithography exposure system. Sending the challenge to the chip may trigger the challenge-response circuitry to output a response, which may be compared with the expected response. In case of matching responses, the chip or a device or software using the chip may be authorized or authenticated. Any known remedies against man-in-the-middle attacks when communicating the serial number, the challenge and the response to and from the chip may be additionally applied.

The predetermined value may be a public key or a private key used in a public-private key encryption scheme. Both a public key and a private key may be stored in the chip for use in the public-private key encryption scheme. The public and/or private key may be derivable from one or more embedded predetermined values using an embedded cryptographic or other mathematical function embedded in the chip. Preferably the embedded function has been created using the same maskless lithography exposure system as used for creating the predetermined value(s). The private key may be embedded within a decryption circuit that has been created in the chip using the same maskless lithography exposure system as used for creating the predetermined value(s).

The serial number may be used to enable parts of embedded functionality or software in the chip. The embedded functionality or software may be created using the same maskless lithography exposure system as used for creating the serial number. Different parts of the embedded functionality or software may be active depending on the serial number. There may be a unique relationship between the serial number and the part to be activated. Alternatively, a range of serial numbers may be tied to a part to be activated. The serial number may be used in conjunction with a uniquely encrypted vector for enabling functionality of the chip depending on the uniquely encrypted vector. For example, a passport chip may be created wherein software is embedded for use in multiple countries, and wherein software for only one country is to be activated depending on the serial number. Thus, chips with MROM containing software for multiple countries can be created, wherein the serial number is used for activating the relevant software portions for a specific country.

The chip with an embedded serial number may be used in conjunction with a computer memory, wherein the computer memory is encrypted using the serial number. The memory without the chip may be undecryptable and therefore inaccessible. Exchanging the chip with another chip may result in the memory becoming undecryptable and therefore inaccessible.

The chip may be used as a ROM mask for data personalization. Personalized, possibly unique data may thus be written onto the chip without the need for expensive non-volatile memory.

The invention claimed is:

1. An electronic device comprising a semiconductor chip which comprises a plurality of structures formed in the semiconductor chip:
   wherein the semiconductor chip is a member of a set of semiconductor chips, wherein the set of semiconductor chips comprises a plurality of subsets of semiconductor chips, and the semiconductor chip is a member of only one of the subsets;
   wherein the plurality of structures of the semiconductor chip includes a set of common structures which is the same for all of the semiconductor chips of the set, and a set of non-common structures, wherein the non-common structures of the semiconductor chip of the subset are different from the non-common structures of the semiconductor chips in every other subset;
   wherein a first portion of the non-common structures and a first portion of the common structures form a first non-common circuit, and wherein the first non-common circuit of the semiconductor chip of the subset is different from a non-common circuit of the semiconductor chips in every other subset.

2. The electronic device according to claim 1, wherein a second portion of the non-common structures is adapted to have a shape that uniquely identifies the first non-common circuit.

3. The electronic device according to claim 2, wherein the shape of the second portion of the non-common structures stores a first predetermined value that is readable from outside the semiconductor chip by automated reading means.

4. The electronic device according to claim 2, wherein the shape of the second portion of the non-common structures stores a first predetermined value by presence or absence of a circuit element or by presence or absence of an interconnection between circuit elements.

5. The electronic device according to claim 2, wherein the shape of the second portion of the non-common structures stores a first predetermined value by presence or absence of a memory cell element or by connection or disconnection of memory cell elements.

6. The electronic device according to claim 2, wherein the shape of the second portion of the non-common structures is formed by a set of metal lines, vias, or circuitry.

7. The electronic device according to claim 2, wherein the shape of the second portion of the non-common structures is formed by a metal layer and the shape represents a bar code or a QR code.

8. The electronic device according to claim 2, wherein a second non-common circuit is formed from the second portion of the non-common structures of the semiconductor chip and a second portion of the common structures of the semiconductor chip, wherein the electronic device comprises at least one input terminal and at least one output terminal and the second non-common circuit is connected to the input and output terminals, and wherein a first predetermined value represented by the shape of the second portion of the non-common structures is electronically readable from the output terminal.

9. The electronic device according to claim 8, wherein the second non-common circuit comprises at least one of:
   a read-only memory circuit which is fabricated with the first predetermined value pre-stored in the read-only memory circuit;
   a logic circuit, wherein the logic circuit is adapted to generate the first predetermined value.

10. The electronic device according to claim 1, wherein the set of non-common structures of the semiconductor chip is different from the set of non-common structures of every other semiconductor chip of the set of the semiconductor chips.

11. The electronic device according to claim 1, wherein the first non-common circuit comprises at least one of:
    a logic circuit which is adapted to generate a second predetermined value in response to an input;
    a read-only memory circuit which is fabricated with a second predetermined value pre-stored in the first non-common circuit.

12. The electronic device according to claim 1, wherein the electronic device comprises at least one input terminal for receiving a challenge and at least one output terminal for outputting a response, and the first non-common circuit forms a challenge-response circuit connected to the at least one input terminal and the at least one output terminal,
    wherein the challenge-response circuit is adapted for generating a response at the at least one output terminal based on a challenge applied to the at least one input terminal, the challenge and the response having a predetermined relationship.

13. The electronic device according to claim 12, wherein the response generated by the challenge-response circuit depends on both the challenge applied to the at least one input terminal and the first predetermined value.

14. The electronic device according to claim 11, wherein the plurality of structures are formed on three or more layers of the semiconductor chip, including one or more non-common layers containing the non-common structures, and at least one common layer above the one or more non-common layers, the at least one common layer containing common structures but no non-common structures.

15. The electronic device according to claim 14, wherein all of the non-common structures are formed in only one layer of the semiconductor chip.

16. The electronic device according to claim 14, wherein the semiconductor chip comprises at least a second common layer below the one or more common layers, the second common layer containing common structures but no non-common structures.

17. The electronic device according to claim 1, wherein the plurality of structures are formed in a plurality of layers of the semiconductor chip, and the non-common structures include at least one of: connections between metal layers of the plurality of layers; connections between a metal layer and a gate in a contact layer of the plurality of layers; connections in a local interconnect layer of the plurality of layers; and a P- or N-doped diffusion region of a transistor or diode of one of the plurality of layers.

18. The electronic device according to claim 14, wherein the non-common structures of the one or more common layers are formed using a charged particle multi-beamlet lithography system, and the common layers are formed using a mask-based lithography process.

19. The electronic device according to claim 18, wherein the set of non-common structures are formed based on chip design data originating from a unique data generator.

20. A method for manufacturing an electronic device according to claim 1, comprising:
    forming the set of non-common structures based on chip design data originating from a unique data generator; and
    forming the plurality of structures in a plurality of layers of the semiconductor chip,
    wherein the non-common structures include at least one of: connections between metal layers of the plurality of layers; connections between a metal layer and a gate in a contact layer of the plurality of layers; connections in a local interconnect layer of the plurality of layers; and a P- or N-doped diffusion region of a transistor or diode of one of the plurality of layers.

* * * * *